(12) United States Patent
Schuetz et al.

(10) Patent No.: US 12,406,540 B2
(45) Date of Patent: Sep. 2, 2025

(54) HOLOGRAPHIC ACCESS CONTROL

(71) Applicant: Carl Zeiss Jena GmbH, Jena (DE)

(72) Inventors: Viktor Schuetz, Kahla (DE); Isabelle Maret, Jena (DE); Robert Heuer, Wichmar (DE); Christoph Erler, Jena (DE); Roman Kleindienst, Weimar (DE)

(73) Assignee: Carl Zeiss Jena GmbH, Jena (DE)

( * ) Notice: Subject to any disclaimer, the term of this patent is extended or adjusted under 35 U.S.C. 154(b) by 39 days.

(21) Appl. No.: 18/291,216

(22) PCT Filed: Jul. 22, 2022

(86) PCT No.: PCT/EP2022/070645
§ 371 (c)(1),
(2) Date: Jan. 22, 2024

(87) PCT Pub. No.: WO2023/002025
PCT Pub. Date: Jan. 26, 2023

(65) Prior Publication Data
US 2024/0355158 A1    Oct. 24, 2024

(30) Foreign Application Priority Data
Jul. 23, 2021 (DE) .......................... 102021207986.5

(51) Int. Cl.
*G07C 9/00* (2020.01)
*B60R 25/20* (2013.01)
(Continued)

(52) U.S. Cl.
CPC .......... *G07C 9/00563* (2013.01); *B60R 25/20* (2013.01); *B60R 25/31* (2013.01);
(Continued)

(58) Field of Classification Search
CPC ............ G07C 9/00563; G07C 9/00309; G07C 2209/65; G07C 9/00174; B60R 25/20;
(Continued)

(56) References Cited

U.S. PATENT DOCUMENTS

| 9,129,179 B1* | 9/2015 | Wong .................... G06F 16/583 |
| 2006/0097844 A1* | 5/2006 | Nakashima ........ G07C 9/00563 340/5.72 |

(Continued)

FOREIGN PATENT DOCUMENTS

| DE | 102019102610 A1 * | 8/2020 | ............. B60Q 1/268 |
| DE | 102019122631 A1 | 2/2021 | |

(Continued)

OTHER PUBLICATIONS

Written Opinion rendered by the International Searching Authority for PCT/EP2022/070645, dated Nov. 15, 2022, 6 pages.

(Continued)

*Primary Examiner* — Jared Walker
(74) *Attorney, Agent, or Firm* — Skaar Ulbrich Macari, P.A.

(57) ABSTRACT

A system for a functionalized pane in a door, through which person-based and/or object-based authorization verification can be carried out is provided. The person-based verification can include a holography-based, stereoscopic holocamera that can be integrated into the pane. In addition, a holographic display that can also be integrated into the pane can be included. Corresponding methods can be used to carry out the authorization verification under the control of the control device and to control a locking mechanism of a door and a holographic display.

22 Claims, 5 Drawing Sheets

(51) Int. Cl.
*B60R 25/31* (2013.01)
*E05F 15/76* (2015.01)
*G03H 1/00* (2006.01)
*G03H 1/04* (2006.01)
*G06V 10/14* (2022.01)
*G06V 20/52* (2022.01)
*G06V 40/10* (2022.01)
*E05F 15/73* (2015.01)
*G06V 40/60* (2022.01)

(52) U.S. Cl.
CPC .......... *E05F 15/76* (2015.01); *G03H 1/0011* (2013.01); *G03H 1/0443* (2013.01); *G03H 1/0465* (2013.01); *G06V 10/14* (2022.01); *G06V 20/52* (2022.01); *G06V 40/10* (2022.01); *E05F 2015/767* (2015.01); *E05Y 2900/132* (2013.01); *E05Y 2900/30* (2013.01); *E05Y 2900/531* (2013.01); *G03H 2222/14* (2013.01); *G06V 40/60* (2022.01)

(58) Field of Classification Search
CPC ...... B60R 25/31; B60R 25/2045; E05F 15/76; E05F 2015/767; G03H 1/0011; G03H 1/0443; G03H 1/0465; G03H 2222/14; G03H 1/2645; G03H 1/24; G03H 2001/2226; G03H 2223/16; G03H 2226/05; G06V 10/14; G06V 20/52; G06V 40/10; G06V 40/60; E05Y 2900/132; E05Y 2900/30; E05Y 2900/531; G02B 6/0095; G02B 5/32; B60Q 1/268
See application file for complete search history.

(56) References Cited

U.S. PATENT DOCUMENTS

| | | | |
|---|---|---|---|
| 2006/0145825 A1* | 7/2006 | McCall | B60R 25/305 340/426.35 |
| 2016/0012654 A1* | 1/2016 | Sherony | G07C 9/257 340/5.72 |
| 2017/0030127 A1* | 2/2017 | Elie | E05F 15/77 |
| 2017/0139375 A1* | 5/2017 | Chung | G03H 1/0005 |
| 2019/0077372 A1 | 3/2019 | Greenberg et al. | |
| 2019/0147676 A1* | 5/2019 | Madzhunkov | H04N 23/90 340/5.2 |
| 2020/0151805 A1* | 5/2020 | Scholl | G06Q 30/0633 |
| 2020/0290513 A1* | 9/2020 | Karafin | G06F 3/017 |
| 2021/0110015 A1* | 4/2021 | McCarty | G06F 21/32 |
| 2022/0025683 A1* | 1/2022 | Becher | E05F 1/10 |
| 2022/0377091 A1* | 11/2022 | Christian | H04L 63/1416 |

FOREIGN PATENT DOCUMENTS

| | | |
|---|---|---|
| EP | 3002736 A1 | 4/2016 |
| EP | 3280621 B1 | 1/2020 |

OTHER PUBLICATIONS

International Search Report rendered by the International Searching Authority for PCT/EP2022/070645, dated Nov. 15, 2022, 2 pages.

* cited by examiner

HOLOGRAPHIC ACCESS CONTROL

PRIORITY

This application claims the priority of German patent application DE 10 2021 207 986.5, filed Jul. 23, 2021, which are hereby incorporated herein by reference in its entirety.

FIELD

The invention relates to a system for a functionalized pane of a door, by means of which a person-based and/or object-based authorization verification can be performed. At least one holography-based, stereoscopic holocam, which can be integrated in the pane, can be comprised for the person-based verification. Further, a holographic display may be comprised, it likewise being possible to integrate the latter in the pane.

By way of appropriate methods, it is possible, under control device control, to perform the authorization verification and control a closure mechanism for a door and a holographic display.

BACKGROUND

Radio-based access controls for vehicles which perform an object-based authorization of a person using the key carried by said person when they enter a near region of the vehicle are known. However, it is also known that such systems on their own have a security problem. Hence, two factor authentication is advantageous in the case of vehicles, and also in other areas, for example in the case of building doors. For example, 2 factor authentication prevents access to the vehicle when the key is stolen/cloned. However, sadly such authentication is very impractical in many cases, for example if a password has to be entered every time for the purpose of gaining access. An identification of the person themselves on the basis of their optical features (example: facial recognition) is therefore advantageous. However, on the one hand, it is often difficult to house the optics of a camera required to this end in the door without this being to the detriment of the spatial requirements of other desired components. On the other hand, such facial recognition can easily be duped, for example by virtue of a mere picture of the person rather than the person themselves being presented. This problem can be rectified by three-dimensional facial recognition, for example, but this increases the spatial requirements even more.

On account of the spatial requirements, there are also tight boundaries with regard to the options of a holographic display or holographic operating element, for example to facilitate the authentication or the operation of the door, or to design this to be more intuitive or contactless.

Often, these elements should also be invisible for esthetic reasons or security reasons.

In particular, the intention often is to provide doors with large-area transparent areas such as windows for practical reasons; however, this makes the use of the aforementioned functionalities and elements more difficult as these typically cannot be housed within the window area.

SUMMARY

Provided herein is a system, a door, a vehicle, a building, a domestic appliance, and/or a method without the disadvantages of the prior art.

In particular, provided is a system or a method which undertakes a secure authorization verification, which is intuitively, easily and hygienically operable, and which, in the process, does not impair the external appearance and the transparency of a pane.

In an example embodiment, a system for a door opener controller of a door or hatch having a functionalized pane, comprises a transparent main body having a front side and a back side for the functionalized pane, at least one holographic camera for a stereoscopic picture recording of a defined detection region vis-à-vis the front side and/or the back side of the transparent main body, and a control device.

In this case, the holographic camera comprises at least one recording hologram which is comprised by the main body and serves to divert light beams from the detection region. Moreover, the camera and the control device are configured for a person-based authorization verification of a person recorded by the stereoscopic picture recording, the person-based authorization verification being based on at least one property of the person that is establishable by the stereoscopic picture recording. In this case, the control device is configured to output an unlock signal for an opening of the door in the case of at least a person-based authorization.

The at least one holographic camera for a stereoscopic picture recording of a defined detection region vis-à-vis the front side and/or the back side of the transparent main body by preference describes at least one holographic camera for a stereoscopic picture recording of a defined detection region which can be situated opposite the front side and/or the back side of the transparent main body.

The fact that the holographic camera comprises at least one recording hologram which is comprised by the main body and serves to divert light beams from the detection region by preference means that the system comprises at least one recording hologram, arranged in or on the main body, for diverting light beams from the detection region for the holographic camera. This recording hologram can, but need not, be considered to be a constituent part of the holographic camera; moreover, it can be a constituent part of a holographic camera system.

A diversion of light beams for the camera is, in particular, a diversion of light beams so that these can be detected by the camera.

Terms such as "system" are not interpreted by a person skilled in the art as meaning that all constituent parts comprised by the system are separate constituent parts. For example, a constituent part may comprise another constituent part. Instead, the term "system" should be understood within the meaning that components claimed here that preferably comprise an apparatus with at least one component provided for installation in, for example, a vehicle or a consumer product. The functionality of the system enabled by the features of the system is advantageously enabled by the installation. Here, the components of the system can be installed at different locations or at the same location; what is important instead is that the features of the system can interact as described following the installation. In this context, the system can be installed from the outset, or else it may also be possible to retrofit the system to the desired product or object at a later date. A system has been claimed here since such a retrofit kit is likewise intended to be encompassed by the claims and since the system is also intended to be claimed independently of the product or object in which it is installed.

A door opener controller of a door or hatch having a functionalized pane relates in particular to the process of opening a closed door. For example, the door opener controller can be a controller for access control to a room, building, vehicle, or device closed by the door.

For example, a door can be a vehicle door, a building door, a room door, a refrigerator door, an oven door, a washing machine door, a tumble dryer door, and/or a freezer door. A washing machine door or tumble dryer door can also be referred to as a loading door. This door can be an interior door and/or an exterior door. Likewise, this can relate to a hatch, for example a trunk lid of a vehicle, a fuel tank cap of a vehicle, etc. When this document makes reference to a door, this by preference also covers all doors, hatches, lids, etc. listed in this document.

By preference, a door opener controller of a door or hatch having a functionalized pane describes a door opener controller of a door or hatch, wherein the door opener controller comprises a functionalized pane or operates in conjunction with the functionalized pane. This functionalized pane can be a constituent part of the door or hatch, but can also be arranged away from the door or hatch, for example next to it.

A door opener controller of a door or hatch having a functionalized pane therefore however in some cases also describes a door opener controller for a door or hatch, wherein the door or hatch comprises the functionalized pane. Then, the functionalized pane is preferably a solid, in particular a materially tight but preferably transparent part of the door or hatch. For example, this may relate to a windowpane.

By way of example, the hatch could also be a fuel tank cap, wherein the functionalized pane is part of the fuel tank cap and by preference opaque, and the extensive main body is attached to the pane and enables the functionality.

For example, the functionalized pane is made of glass or transparent plastic.

By preference, the functionalized pane is an extensive element.

However, this may also relate to a substantially opaque pane or a pane that is sufficiently transparent to enable the functionality but does not give the impression of being transparent from the outside, especially when it is applied to an opaque surface. For example, this may relate to a tinted pane.

In particular, functionalized means that the pane can be used for a function, especially as described in this document. For example, the pane can be used for a camera as described herein or a display as described herein.

A functionalized pane can be in particular an extensive element with the desired optical or esthetic properties. In particular, a functionalized pane may comprise a substrate.

The transparent main body having a front side and a back side for the functionalized pane can for example be a part of the functionalized pane. In some cases, the transparent main body can even form the functionalized pane.

However, the transparent main body can for example also be applied to the functionalized pane, for example in the form of at least one layer. The transparent main body by preference enables the functionality.

In particular, the transparent main body can be a substrate.

Transparent preferably means that it is possible to look through the main body. In particular, transparent means that the main body has a transmittance related to the intensity of the light (by preference in a wavelength range between 420 nm and 750 nm) of at least 40%, at least 45%, at least 50%, at least 55%, at least 60%, at least 65%, at least 70%, at least 75%, at least 80%, at least 85%, at least 90%, and/or at least 95%.

However, transparent may also mean that the main body has the above-described transparency only for a smaller wavelength range within the specified larger range, for example for a range of 100 nm or less, 50 nm or less, or 20 nm or less within the wavelength range between 420 nm and 750 nm. In particular, the smaller wavelength range is chosen such that the functionality described herein is made possible.

The main body can be sufficiently transparent to enable the desired optical functionality but not give the impression of transparency from the outside, especially when it is applied to an opaque surface. For example, this may relate to a tinted main body.

The transparent main body preferably is an extensive, transparent main body. In this context, extensive means, in particular, forming a relatively wide surface, flattened, and/or extending on a surface. For example, extensive can mean that the main body has a great extent along a plane or surface and a comparatively significantly smaller extent in a direction perpendicular thereto. In this case, the plane or surface can also be a curved plane or surface. A significantly smaller extent by preference means an extent smaller than the smallest extent along the surface or plane by at least a factor of two.

In this case, the transparent main body can be of a functionalized waveguide for a detector system as described in WO 2020/157306 A1, WO 2020/157307 A1, WO 2020/157308 A1, WO 2020/157309 A1, WO 2020/157310 A1, WO 2020/157311 A1, WO 2020/157312 A1 and/or WO 2020/157313 A1.

By preference, the recording hologram can comprise a transmissive and/or reflexive hologram.

A holographic camera (holocam) by preference is a camera configured so that radiation incident on the front side or back side of the transparent main body can be recorded as a picture, preferably without this substantially influencing the transparency of the main body with regard to looking therethrough. For example, this can be realized by a holographic and/or diffractive structure which diverts some of the radiation, for example to a suitable image sensor for recording a picture, either directly or using at least one further diffractive and/or holographic structure.

Holographic cameras are part of the prior art and are sufficiently described for example in the aforementioned documents, so that a person skilled in the art knows how they can realize an appropriate holographic camera.

Therefore, a person skilled in the art also knows how they could realize at least one holographic camera for a stereoscopic picture recording of a defined detection region vis-à-vis the front side and/or the back side of the transparent main body.

At least one holographic camera for a stereoscopic picture recording preferably comprises two holographic cameras for a stereoscopic picture recording. In this case, the pictures recorded by the two holographic cameras in particular are used and/or combined for the stereoscopic picture recording.

At least one holographic camera for a stereoscopic picture recording can preferably be a holographic camera system for a stereoscopic picture recording. A holographic camera system can comprise one or more of the following components: a holographic camera, an image sensor, and/or a recording hologram, which render the system suitable for a stereoscopic picture recording.

Two holographic camera systems for a front side and a back side may also be encompassed, for example comprising a total of at least four holographic cameras, for example for realizing a recording from a door for an interior region and an exterior region.

By preference, the detection region describes a spatial region, from which the light beams used for recording pictures originate or which these light beams have traversed prior to an incidence on the front side or back side of the main body.

For example, a person skilled in the art could use two individual holocams for a stereoscopic picture recording, as described in this document and in the aforementioned documents. In this case, they could combine the respective recorded or diverted radiation or the picture material arising from this radiation, in such a way that they obtain a stereoscopic picture recording. The use of three or more holographic cameras may also be preferable.

Stereoscopic preferably means that a picture is recorded from two different, by preference adjacent locations, in order to record at least one recorded object from, by preference, two slightly different observation angles. In particular, this allows spatial depth information to be obtained by the recording and recording the at least one object from the different angles advantageously allows additional information to also be recorded during the recording process. By preference, a stereoscopic recording is comparable to the observation of at least one object using a pair of eyes. As a result of the spacing of the eyes and the slightly different viewing angles arising therefrom, the observer is able to obtain spatial information during the observation, for example regarding the approximate distance of the object or the spatial shape of the object. By preference, a stereoscopic picture recording comprises the recording of two pictures which by preference are recorded from different, in particular adjacent locations. In particular, the adjacent locations can be realized by virtue of two lenses being comprised. For example, these can be realized in part by two recording holograms or by one recording hologram with two recording regions. In this case, it may be preferable for these pictures to be recorded simultaneously, for the purpose of which use is preferably made of two pictures sensors. However, it may also be preferable to record the picture recordings alternately from two different locations at a high frequency, for example using only one image sensor. For example, a high frequency may comprise a frequency of at least 50 Hz and, in particular, should be chosen such that, for the purposes envisaged here, a person to be recorded who is in motion can be considered to be substantially at rest for two alternating recordings. For example, this can be realized by an adjustable polarization filter which is switched at the appropriate frequency, wherein the holograms used for the respective recordings by preference have corresponding polarizations which can be filtered by the filter.

However, it may also be preferable for the different recording perspectives for a stereoscopic picture recording to be realized by virtue of only one camera and/or one recording hologram being used and however the person to be recorded having to move, for example turn the head once to the left and/or once to the right for a facial recognition, in order to realize the different perspectives within a relatively short time sequence. This could constitute a particularly simple realization of a stereoscopic picture recording, although it requires compromises with regards to security vis-à-vis the simultaneous recording of the person from different perspectives. However, high security can also be realized in this case if the sequence of picture recordings is sufficiently high.

A picture recording may preferably consist of a single picture but may preferably also consist of a series of pictures and, in particular, a video recording which images moving pictures.

For instance, a typical spacing between adjacent locations from where stereoscopic picture recording is undertaken may approximately correspond to the eye spacing and can be between 50 and 80 millimeters (mm), for example. However, other spacings, preferably in the range between 10 mm and 1 meter (m), can also be used.

In particular, a stereoscopic recording can be used to distinguish whether the structures established during the picture recording have a three-dimensional form, which is to say for example have different distances from the observer, or whether they merely are two-dimensional structures within a plane. For example, this allows a distinction to be made between the photo of a face and an actual face with a three-dimensional surface.

By preference, the stereoscopic picture recording is directed to distinguishing persons on the basis of their recognizable features, in particular their facial features, or categorizing persons on the basis of specific properties and, in particular, taking account of three-dimensional features in the process. In particular, the stereoscopic picture recording is suitable for a three-dimensional facial recognition, a motion detection, and/or an iris recognition.

Motion detection can be undertaken on its own or in addition to a facial recognition and/or an iris recognition and can for example comprise specific predefined movements, which are also user specific and/or able to be individualized. By way of example, it may be preferable that a vehicle door or a house door can only be opened by a specific movement, in particular a dance movement, which a user has by preference specified for the system.

In the case of an iris recognition, too, a stereoscopic picture recording can by preference increase the security during the authorization verification, in particular as a result of the different observation angles. For example, this allows for better compensation of shadowing by the frame of a pair of spectacles in the case of spectacle wearers.

By preference, the at least one holographic camera for the stereoscopic picture recording can also make "normal", non-stereoscopic recordings in addition to a stereoscopic picture recording. For example, facial recognition can be performed in three dimensions and there can be an additional two-dimensional iris recognition by at least one camera. This can further increase the security.

It can also be preferable to recognize specific objects. By preference, this can also be encompassed by the person-based authorization verification. By preference, an object recognition can be improved by a stereoscopic picture recording. By way of example, a system integrated in a fuel tank cap can recognize whether the fuel nozzle for the correct fuel is used, for example diesel or premium grade gasoline.

In particular, a control device is at least one integrated circuit, for example at least one microprocessor, at least one processor or processor unit, at least one CPU, at least one computing device, and/or at least one computer. For example, a control device can comprise an application-specific integrated circuit (ASIC), a programmable logic device (PLD), or a field programmable gate array (FPGA). Moreover, components known to a person skilled in the art in this context, for example at least one integrated circuit, at least one digital-to-analog converter, at least one analog-to-digital converter, and/or at least one amplifier may be encompassed.

The holographic camera comprises at least one recording hologram which is comprised by the main body and serves to divert light beams from the detection region. By preference, the recording hologram is suitable for diverting at least some of the light beams from the detection region, with the result that these can be used for picture recording purposes. By way of example, the light beams can be diverted to a detector, for example in the form of an image sensor.

The recording hologram is preferably a diffractive structure. Preferably, holographic and diffractive, and hologram and diffractive element, respectively, can be used synonymously within this document.

The recording hologram preferably diffracts at least some of the light from the detection region such that the light is diverted for picture recording purposes. In this case, the recording hologram may comprise a plurality of holograms, for example at least two holograms. A common hologram may be encompassed, the latter being configured to record the light from two spaced apart locations for the two recordings required for stereoscopy. However, this may preferably also relate to two separate recording holograms.

By preference, the recording hologram can be considered to be the analog of a lens or part of a lens of a "conventional" camera, wherein the recording hologram collects and/or diverts the light to be recorded. It may be preferable for the recording hologram to also have beam-shaping properties in this case.

The detection region can preferably be chosen appropriately according to the specific application of the system, for example during the production of the hologram. For example, if the system is integrated in a side door of an automobile and the functionalized pane is its side window, which preferably encompasses the main body, then, by preference, the detection region can be chosen such that the face of a person of average size, who is stood at a distance from the side door suitable for manually opening the side door from this position (e.g., at a distance of less than 1 meter (m), preferably less than 0.6 m from the side door), is diverted by the recording hologram. The detection region is preferably a sufficiently large volume so that the faces of persons of different sizes can be used, at a practicably large distance range from the main body, for a person-based authorization verification. In this context, the recording hologram on the one hand can divert light from a sufficiently large angular range or angular spectrum and, on the other hand, the control device, by way of suitable post-processing of the data originating from the picture recording, can also make a contribution to increasing the detection region, if required, by virtue of taking account of distortions, blurs or other optical effects during the authorization verification.

By preference, the detection region is the region from which the radiation coming from an object to be detected and incident on the front side and/or back side of the main body comes. The recording hologram can be configured, in particular, to deflect radiation incident on the main body at right angles. However, it may also be optimized for other angles, for example if the desired detection region is located above, below, and/or laterally offset and/or if the pane encompassing the main body is obliquely arranged. The recording hologram may likewise have a beam-shaping function, for example a collimating function, and/or may take account of the curvature of a pane encompassing the main body.

By preference, the recording hologram is substantially or at least partially transparent such that the main body is substantially or at least partially transparent at the location where the hologram is arranged.

Preferably, the recording hologram deflects light from at least one spectral range. In this case, the spectral range can be narrow, for example, converted to the wavelength, of the order of 1 nanometer (nm), but it can also be of the order of 10 nm or 100 nm or more.

Terms such as "substantially", "approximately", "about", "circa", etc., preferably describe a tolerance range of less than +20%, preferably less than +10%, even more preferably less than +5%, and in particular less than +1%. Information qualified by substantially, approximately, about, circa etc. discloses and always includes the exact stated value.

The recording hologram can be configured to divert various angular spectra and/or spectral ranges. For example, the recording hologram may comprise a plurality of holograms, which each divert one angular spectrum and/or one spectral range. These holograms can be arranged one above the other, in particular one above the other in stacked fashion, in what is known as a stack.

In an alternative embodiment, the hologram components assigned to the respective angular spectra and/or spectral ranges are present in a single recording hologram, in particular in what is known as a hologram film, in which they have been jointly exposed. By preference, such a recording hologram is also referred to as a so-called multiplex hologram.

The region in which the recording hologram is situated is preferably also referred to as input coupling region and the recording hologram as diffractive structure. In particular, this is an apt designation if the light radiation from the detection region is input coupled into the main body for further light guidance within the main body.

In this case, the transparency of the recording hologram and/or input coupling region preferably depends on the efficiency of the radiation input coupling and/or the efficiency of the diversion of the light beams. As the input coupling efficiency and/or diversion efficiency increases, the transparency in the input coupling region and/or recording hologram decreases at the same time.

With the aim of the highest possible transparency, the diversion and/or input coupling of radiation by means of, for example, the diffractive structure (in particular the at least one volume hologram) may be precisely so efficient that a sufficient radiation power impinges on the output coupling region. The partially transparent input coupling region can be designed so that the input coupling efficiency and/or diversion efficiency is 2%, 5%, 10%, 15%, 20%, 25%, 30%, 35%, 40%, 45% or 50%, for example. By preference, this efficiency is related to the part of the spectrum diverted by the recording hologram. However, it may likewise be related to the entire visible frequency spectrum of the light. In particular, the input coupling efficiency can be in the range of 2%-50%, such that the transparency of the input coupling region is in the range of 50%-98%.

By preference, holographic and diffractive are used synonymously in this document. In particular, a holographic element, for example a hologram, denotes the manner of production by means of an exposure, for example to an appropriate reference wave and object wave, adapted to the desired diffraction. By preference, computer-generated holograms, the computer-assisted calculation of which is based on holographic principles, can also be comprised.

The camera and the control device are configured for a person-based authorization verification of a person recorded by the stereoscopic picture recording. By preference, a person-based authorization verification is an authorization verification allowing an authorization able to be performed with the assistance of the person to be authorized themselves and their properties. By preference, verification means a check as to whether an authorization is present. To this end, the person by preference does not need to carry along any object, for instance a key or a document, for identification purposes.

The fact that the camera and the control device are configured for a person-based authorization verification as described herein means that appropriate means, known to a person skilled in the art, are present in order to carry out this verification. For example, the camera may supply a preferably electrical output signal, which is fed to the control device, for example by way of signal lines. Then, the control device comprises appropriate means, for example at least one processor and at least one data memory, with the aid of which the verification is carried out. For example, an appropriate algorithm implemented by the control unit, for example a recognition algorithm, can be used to this end.

In this case, the person-based authorization verification is by preference undertaken on the basis of properties learnt and/or specified in advance. For example, there can be a learning mode in which further faces are added for a facial recognition.

The person-based authorization verification is based on at least one property of the person establishable by the stereoscopic picture recording. A property of the person establishable by the stereoscopic picture recording can be a two-dimensional property, located in a (two-dimensional) plane, and, in particular, a three-dimensional property of the person. In particular, the property of the person may comprise their facial characteristics.

The authorization verification is preferably also referred to as authentication, with the authorization also being referred to as authenticating.

Preferably, the authorization verification described herein comprises a facial recognition, in particular a 3-D facial recognition.

For example, the following steps, in particular, can be realized by the control device and the algorithm implemented thereby:
  recognizing and extracting the facial picture from the picture background;
  aligning the facial picture, for example in order to take account of the facial position, picture size, and further picture properties, for example illumination and grayscale values. By preference, this facilitates the localization of facial features;
  localizing facial features (facial feature extraction). By preference, the facial features comprise eyes, nose, and/or mouth. In this case, the facial features are by preference localized in the picture and measured in order to represent the face and ascertain what is known as a feature vector of the face;
  comparing the facial features and/or feature vector with known faces, facial features, and/or feature vectors, which for example are present stored in a database.

What follows below are only a few preferred example algorithms for facial recognition (recognition algorithms):
  identifying facial features by extracting orientation points and/or features from a facial picture; for example, analyzing the relative position, size, and/or shape of the eyes, nose, cheekbones, and/or jaw and using these features for searching for facial pictures with suitable features;
  normalizing a gallery of facial pictures, compressing the facial data, with only data in the picture which are useful to the facial recognition being stored, and comparing a specific facial picture with the facial data. For example, the algorithm can be based on template matching techniques, which are known to a person skilled in the art.

By way of example, recognition algorithms may comprise geometric recognition algorithms. These by preference consider facial features as described.

Likewise, recognition algorithms can comprise photometric recognition algorithms. These preferably encompass a statistical approach, wherein the picture is advantageously divided into values, and the values are compared with templates for the purpose of eliminating/establishing deviations.

Recognition algorithms may likewise comprise holistic recognition algorithms, in which the face should by preference be recognized in its entirety.

Likewise, recognition algorithms can comprise feature-based recognition algorithms. By preference, these divide the face into components and/or features and analyze them and by preference their spatial position with respect to one another.

By preference, the at least one recognition algorithm comprises at least one algorithm selected from the group comprising principal component analysis using eigenfaces, linear discriminant analysis, elastic bunch graph matching using the Fisherface algorithm, the hidden Markov model, multilinear subspace learning using tensor representation, and/or neuronal motivated dynamic link matching.

By preference, what is known as a face hallucination algorithm may be comprised. Advantageously, these can facilitate facial recognition in surroundings with a high signal-to-noise ratio and by preference can be used prior to the application of the actual recognition algorithm. Such an algorithm preferably uses example-based machine learning with pixel substitution and/or indices for the distribution of the nearest neighbors. By preference, demographic and/or age-related facial features can be included in the process. If appropriate training data are used, a partially concealed face can advantageously also be recognized as a result of using such algorithms.

A three-dimensional facial recognition, preferred here, is by preference based on picture recordings which comprise pieces of information about the shape of a face, in particular a stereoscopic picture recording. For example, these pieces of information can be used to recognize and/or identify prominent facial features, in particular on the surface of the face, for example the contour of eye sockets, nose, and/or chin. Advantageously, a 3-D facial recognition is not influenced by changes in the illumination. Moreover, a face can advantageously be identified from different viewing angles, for example in a profile view, and the precision of the facial recognition can be improved. By preference, matching techniques can be used for the 3-D facial recognition, in particular a metric geometry, for example to treat expressions as isometries.

In particular, a 3-D facial recognition can prevent an authorization verification from being duped by a two-dimensional photo of the face of a person replacing the actual face of the person.

By preference, authorization means a granting of rights on account of a positive verification of previously defined criteria. For example, these criteria may relate to one or more person identities, membership of a group of people, and/or the presence, carrying along, and/or use of a certain object. A person-based authorization preferably comprises an authorization on the basis of one or more person identities and/or membership of a group of people. In this context, granting of rights means, in particular, at least partial granting of the right to open the door. In this context, an at least partial right means that the right to open may also be based on more than one authorization, with the person-based authorization being one of these numerous authorizations. In particular, a person-based authorization may take place if the face of an entitled (preferably authorized) person is located in the detection region and is recognized on the basis of at least one property of the person, in particular in their face, which is establishable by the stereoscopic picture recording.

In this case, the control device is configured to output an unlock signal for an opening of the door in the case of at least a person-based authorization. In particular, the unlock signal is a signal which can then be output to a closure component and on the basis of which the closure component can undertake an unlocking of the door. For example, an unlock signal may comprise an electrical signal and/or an optical signal. Thus, following an authorization, which is to say preferably a corresponding granting of rights, the control unit also actually outputs an appropriate signal as a consequence, said signal, in combination with further elements, being able to allow the door to be opened and consequently being able to turn the initially theoretical granting of rights into an actual consequence.

In this case, the control device is especially configured to output an unlock signal for an opening of the door only in the case of at least a person-based authorization, and not to do so otherwise.

By preference, the control device can further be configured to output a close signal for closing the door, or to continue to output such a signal if there is no person-based authorization.

It may be preferable for the system to be configured to simultaneously project light, especially structured light (e.g., a grid pattern for facilitating facial recognition), for example in the infrared range, into the detection region and in particular onto the face. Advantageously, this can improve a three-dimensional facial recognition. By way of example, the projection can be undertaken by a corresponding light source and a projection hologram comprised by the main body.

By way of an authorization verification based on a property of a person establishable by the stereoscopic picture recording, the described system is able to increase the security and reliability of an authorization verification. For example, an authorization by a two-dimensional image of the property of a person can advantageously be prevented and hence deceptions can be avoided. Moreover, the authorization can even be realized under more difficult optical conditions because the stereoscopic recording can increase the reliability, which is also based on a certain data redundancy and/or on an increased information content of the picture recording on account of the different viewing angles. At the same time, a picture recording can be undertaken from the transparent main body as a result of using the holographic camera. As a result, it is possible to realize a functionalized pane which, in addition to the possibility of being looked through, can realize a camera function on account of the transparency. For the picture recording, it is possible to realize a recording position which is not realizable otherwise since a pane usually cannot be functionalized in this way. Especially when used in some fields, for example for an automobile door, the recording position from the side window, which advantageously can be realized, is ideal for a person-based authorization verification since a person intending to open a door typically adopts a position in front of the window of the door in relation to the position within a horizontal plane. It is possible to record a direct view by a transparent, invisible camera. As a result of the realization described herein, the camera can be realized in "invisible" fashion and can thus offer an additional security aspect, for example by virtue of also being able to make recordings of persons who make an authorized attempt to open the door. For example, a type of door spy and monitoring security function into the outside space can be realized by the holocam. This "invisible" implementation may also be advantageous for aesthetic considerations. Additionally, the functionalized pane may be larger because there is no need to create additional space for the camera. For example, this can increase the security in a vehicle.

In a further preferred example embodiment, the system also comprises a first communications means for transmitting and receiving signals, wherein the first communications means and control device are configured for an object-based authorization verification of an assigned, second communications means for transmitting and receiving signals, especially if the latter is located in the transmission and reception range of the first communications means. In this case, the object-based authorization verification is based on a position and/or movement of the second communications means in relation to a specified near region of the first communications means and on properties of signals exchanged between the first and second communications means, wherein the control device is configured to output an unlock signal for an opening of the door in the case of the person-based authorization and an object-based authorization of the second communications means.

For example, the signals to be transmitted and received can be electromagnetic signals, in particular optical signals, infrared signals, and/or other signals for wireless transmission, for example radio waves, in particular long waves, medium waves, short waves, and ultrashort waves, radar waves, and/or microwaves.

The first communications means for transmitting and receiving signals can for example comprise a transceiver for radio waves and/or optical signals, and/or wireless communications interface. It may comprise at least one antenna for transmitting and/or receiving electromagnetic signals from the first communications means. Moreover, the first communications means may comprise components known to a person skilled in the art in this context, for example at least one integrated circuit, at least one digital-to-analog converter, at least one analog-to-digital converter, and/or at least one amplifier.

By preference, the second communications means can likewise comprise the components specified in the context of the first communications means.

For example, the first and second communications means may be based on NFC and/or RFID technology.

The first communications means and control device are configured for an object-based authorization verification of an assigned, second communications means for transmitting and receiving signals.

An object-based authorization verification by preference denotes an authorization verification which is based on verifying the presence, the carrying along and/or the use of a specific, authorized object. By way of example, this object can be a key which comprises the second communications means.

By preference, the second communications means is at least one second communications means. By preference, an assigned, second communications means for transmitting and receiving signals is suitable for communicating with the first communications means and in particular for receiving the signals therefrom and transmitting signals thereto. This is preferably encompassed by the term assigned. Advantageously, assigned also means that there can be a multiplicity of second communications means which are suitable for communicating with the first communications means and in particular for receiving the signals therefrom and transmitting signals thereto, wherein however only a subset of second communications means, preferably fewer than 10, more preferably fewer than 5, and in particular fewer than 3 second communications means, are in fact able to lead to authorization in the authorization verification. These are also referred to as authorized second communications means. For example, a plurality of keys may comprise a second communications means which exchanges signals with the first communications means; however, only one key and one replacement key are assigned in the sense that they are able to lead to an object-based authorization.

An object-based authorization preferably comprises an authorization on the basis of the presence, carrying along and/or use of a specific object, for example an assigned key.

The object-based authorization verification is based on a position and/or movement of the second communications means in relation to a specified near region of the first communications means and on properties of signals exchanged between the first and second communications means. Therefore, the object-based authorization verification by preference comprises two verification steps: firstly, there is a verification as to whether the second communications means (and preferably the object comprising the latter) is for example situated within the specified near region of the first communications means. Secondly, the exchanged signals are by preference used to verify whether the second communications means is the authorized second communications means.

A specified near region is preferably defined as a spatial region that is uniquely definable in relation to the first communications means and/or its components. For example, a spatial region may comprise a volume. In this case, in relation to the first communications means preferably means in relation to the first communications means when the latter is encompassed in a door. For example, the spatial region can be defined unambiguously in relation to the door and/or the first communications means, with respect to its dimensions in the various spatial directions and in relation to the reference point from where these dimensions are determined. In this context, there can preferably be minimum and maximum dimensions. In this case, the reference point is preferably uniquely determined in relation to the door and/or the first communications means. For example, the first communications means can be configured and installable in the door such that the near region is located on one side of the door and comprises a certain "box" or a certain spherical portion in relation to a reference point encompassed by the door. In an example, the near region is chosen so that it only relates to the external side of the vehicle vis-à-vis the door and comprises at least one region at a distance of one meter from the external side of the door, and all spatial regions which are at a distance of one meter from the external edges of the door. Advantageously, the near region should preferably be defined in relation to a door in which the system is installed; however, it is clear to a person skilled in the art that, even in that case, the near region is ultimately advantageously defined in relation to the first communications means and its components, because by preference these are securely installed in the door. By preference, a reference point can be defined in relation to the first communications means, and the near region is specified in relation to said reference point. Then, by preference, a specified near region of the first communications means is a specified near region in relation to this reference point. For example, the reference point can be the arrangement point of the transmission and/or reception component, or the geometric centroid of the plurality of transmission and/or reception components in the case where a plurality of transmission and/or reception components are comprised.

Preferably, the near region can be arranged in isotropic fashion in relation to the first communications means. It may likewise be preferable for the near region to be defined differently in each case in relation to the respective directions as seen from the first communications means. For example, the near region as described above may comprise a half space divided by the door.

The near region preferably is at least one near region. By preference, a plurality of near regions may be comprised, it being possible to make a distinction therebetween. For example, if the door is an exterior door, it is possible, by preference, to make a distinction between the interior region located "behind the door" and the exterior region located "in front of the door" and that, for example, an authorization is only undertaken in the one case and not in the other case. For example, depending on the embodiment, an unlock signal, a holographic display, and/or the holocam may be output only in one case and not in the other.

An object-based authorization verification which is based on a position of the second communications means in relation to the specified near region by preference has, as a necessary criterion for the object-based authorization, the requirement that the second communications means is located within the specified near region. By preference, the object-based authorization is therefore based at least in part on a position of the second communications means within the specified near region of the first communications means. For example, this can be realized on the basis of a specified minimum signal strength between first and second communications means and/or a localization mechanism based on the signals, for example on the basis of triangulation.

An object-based authorization verification which is based on a movement of the second communications means in relation to the specified near region may include, for example as a necessary criterion or as additional necessary criterion, the requirement that the second communications means carries out a coming closer and/or moving away movement in relation to the first communications means and its near region. For example, this may be established on account of an increasing and/or decreasing signal strength between the first and second communications means. It may likewise be preferable that certain movement patterns of the second communications means have to be performed within the near region as a necessary criterion for an object-based authorization. For example, user-specific, individual movements may be carried out, which for example were previously "taught" to the system in a learning mode.

In addition to the position and/or the movement of the second communications means in relation to a specified near region of the first communications means, the object-based authorization verification is moreover based on properties of signals exchanged between the first and second communications means. By preference, this means that signals exchanged between the two communications means can be used to establish whether the second communications means is authorized. Appropriate options for authentication are known to a person skilled in the art, for example based on a secret shared between the first communications means and second communications means, and/or cryptographic encryption and authentication methods.

The control device is configured to output an unlock signal for an opening of the door in the case of the person-based authorization and an object-based authorization of the second communications means. Thus, the security can be increased by way of a two factor authorization.

A possible exemplary embodiment of this embodiment is described below. For example, the first communications means can transmit (e.g., inherently or following an event-based trigger) an encoded enquiry signal, for example an electromagnetic signal, in particular at LF frequency of 125 or 130 kHz, via at least one antenna, wherein the first communications means is subsequently ready to receive, for example in the UHF range (e.g., 433 MHZ, 868 MHz, and/or 315 MHZ). In this context, it is ready to receive a confirmation transmitted by the second communications means. When the second communications means is in range, it receives the signal, for example at 125 kHz, decodes said signal and subsequently retransmits this signal with a new encoding, for example in the UHF frequency band. The signal thus received by the first communications means is then decoded by the latter (and/or the control device) since first communications means and second communications means are advantageously configured to undertake this coding. Corresponding coding methods are known to a person skilled in the art. Hence, the first communications means can preferably compare the originally transmitted signal with the signal received by the second communications means. No unlock signal is generated if within a defined time period there is no response meeting certain comparison criteria. For example, the system then switches (back) into a standby mode. However, if the signals correspond to or meet these certain comparison criterion, this by preference causes an authorization and an unlock signal is generated.

In a further preferred example embodiment, the control device is configured to enable a person-based authorization verification only after an object-based authorization. This is a particularly advantageous embodiment of the two factor authorization, in which initially the simpler and less secure object-based authorization verification is carried out, followed by the more complex, energy-intensive, and secure person-based authorization verification. In this case, the specified near region preferably is larger and/or further away from the system and/or door than the detection region. Thus, advantageously, this embodiment is particularly efficient from this aspect, too.

A further preferred example embodiment comprises a closure component which is configured for locking or unlocking the door, wherein the closure component is configured for an unlocking of the door when the unlock signal is output by the control device. In particular, a closure component may comprise a lock for a door and/or an adjustable latch for a door lock. By preference, the latch is an extended state for locking and can be moved into a retracted state for unlocking.

A further preferred example embodiment comprises an operator control component which is configured for an operation of the door by the person. An operation of the door preferably denotes an opening of the door and/or a partial step required for an opening of the door, especially in the case of an unlocked door. In particular, an operator control component may comprise a door handle and/or a component corresponding to the functionality of a door handle.

A person skilled in the art knows that all advantageous combinations of embodiments described herein may also be comprised, for example an embodiment may comprise both an operator control component as described herein and a closure component as described herein. Naturally, this also applies to other aspects described herein.

In a further preferred example embodiment, the operator control component is configured for an activation of the operator control component when the unlock signal is output by the control device. In particular, an activation of the operator control component comprises a method step required to enable a subsequent operation. For example, a door handle can be released and/or extended upon activation, in order to enable an operation. If the operator control component is a switch, the latter can likewise be released and/or illuminated upon activation.

In a further preferred example embodiment, the operator control component comprises a proximity sensor and/or motion detector on the basis of ultrasound, an optical sensor a wireless communications interface, and/or radar. This can realize a contactless operation by an approach, a movement, and/or a gesture. Preferably, such an operator control component is activated by the output of the unlock signal since an operation should only come into question once authorization has taken place. This allows a contactless operation to be implemented.

In a further preferred example embodiment, the operator control component comprises at least one capacitive sensor. Capacitive sensors are known for example from touch-screens and have a particularly simple and reliable operation.

In a further preferred example embodiment, the operator control component comprises a holography-based operator control component. What is known as a holographic button is based in particular on the principle that as a result of using holograms a button can be displayed "floating" in three dimensions and, in particular, in a manner detached from a door surface, and a gesture within the depicted region can likewise be fed to a detector, and hence be detected, by way of an appropriate hologram. Thus, a particularly intuitive contactless operation of the operator control component can likewise be realized. In particular, the holographic operator control component can be realized by at least one hologram in the transparent main body. The holographic camera can preferably also be used to detect an operation gesture.

In a further preferred example embodiment, the system furthermore comprises at least one first holographic display for a display of at least one picture directed at a person, preferably in a defined display region vis-à-vis the front side and/or the back side of the transparent main body.

In particular, a holographic display is a display generated using a hologram, especially a display hologram. In particular, a holographic display can give a three-dimensional impression and/or realize very flexible display options on account of the very individually adjustable diffraction properties of holograms.

By preference, the defined display region describes a spatial region in which the picture is intended to be observed.

By preference, the holographic display can be used to display the holographic operating element, in particular the holographic button.

The display region can preferably be chosen appropriately according to the specific application of the system, for example during the production of the used hologram. For example, if the system is integrated in a side door of an automobile and if the functionalized pane is the side window thereof which preferably comprises the main body, then the display region can by preference be chosen such that it substantially or partially corresponds to the detection region. It may also be preferable for the detection region to be encompassed by the display region, with the display region being larger. Thus, for example, the display in the display region may indicate where the detection region is situated. The display region is a volume which is preferably sufficiently large to allow persons of different sizes to identify the display in a practicably large distance range from the system and/or the door comprising the system. By preference, the display region can also be referred to as an eyebox.

For example, the display of the access rights status can be realized in a transparent area.

In a further preferred example embodiment, the first holographic display or at least one second, comprised holographic display is configured to generate the display in the case of an illumination from an ambient light of the transparent main body.

For example, it may be preferable for the first holographic display to generate the display by a distinct light source, wherein the second holographic display generates the display by ambient light.

In particular, ambient light is natural and/or artificial light which comes from the surroundings of the system and/or from the surroundings of the door comprising the system, and is present independently of the system. For example, ambient light can comprise sunlight and/or light from street lighting. In particular, ambient light is light not originating from a light source comprised by the system. By preference, a holographic display generated from ambient light is also referred to as a "passive" holographic display, and a display hologram used for the passive holographic display is also referred to as a "passive" display hologram.

By contrast, a holographic display generated by the illumination of a hologram by a light source or a picture generator is preferably referred to as an active hologram.

By preference, a passive hologram does not have a defined display region in comparison with the active hologram since, on account of the preferably spectrally wide illumination of the ambient light with a large angular spectrum, it is in particular not possible to restrict the display to only a specific region. Such a holographic display is particularly simple to realize, efficient, and low maintenance.

In a further preferred example embodiment, the holographic display and the control device are configured to generate the first display of the picture in the case of a signal by a proximity sensor comprised by the system, wherein the proximity sensor and the control device are configured to generate the signal upon a detection of a person in the near region of the system and/or door. Advantageously, the proximity sensor can be realized as described above.

For example, such a display can be generated if a corresponding hologram and a light source, matched thereto, for illuminating the hologram are comprised, which are controlled by the control device in the case of an appropriate detection in order to generate the display by illuminating the hologram. For example, in this case the hologram can be a display hologram comprised by the transparent main body.

In a further preferred example embodiment, the holographic display and the control device are configured to generate the first display of the picture in the case of the object-based authorization and/or the person-based authorization.

For example, such a display can be generated if a corresponding hologram and a light source, matched thereto, for illuminating the hologram are comprised, which are controlled by the control device in the case of an appropriate authorization in order to generate the display by illuminating the hologram. For example, in this case the hologram can be a display hologram comprised by the transparent main body.

By preference, a display hologram includes the pieces of picture information to be displayed. These can generate a real and/or virtual picture, in particular by diffracting and/or diverting suitable light beams. The display hologram can be configured to divert various angular spectra and/or spectral ranges. For example, the display hologram may comprise a plurality of holograms, which each divert one angular spectrum and/or one spectral range. These holograms can be arranged one above the other, in particular one above the other in stacked fashion, in what is known as a stack.

In an alternative embodiment, the hologram components assigned to the respective angular spectra and/or spectral ranges are present in a single display hologram, in particular in what is known as a hologram film, in which they have been jointly exposed. By preference, such a display hologram is also referred to as a so-called multiplex hologram.

For example, such display holograms can also generate multicolor pictures which, depending on the illumination, arise for example simultaneously, on the basis of the respective illumination color and/or on the basis of the respective observation angle.

For example, a display generated in the case of an object-based authorization can indicate the detection region for the person-based authorization verification.

For example, a display generated in the case of a person-based authorization or a person-based and object-based authorization can indicate an operating region of the operator control component.

A simplified operability of the system can be obtained thus.

In a further preferred example embodiment, the system comprises a light source for illuminating at least one first display hologram which is comprised by the transparent main body and which serves for the first display upon reception of a display signal, wherein the control device is configured to output to the light source the display signal in the case of the object-based authorization, the person-based authorization, and/or a detection of a person in the near region of the system and/or door, and wherein the display hologram and the light source are configured for the generation of the display of the picture in the case of the illumination, preferably of the display hologram, by the light source.

For example, a light source may comprise an LED and/or a laser. In this case, the first display hologram comprises the pieces of picture information to be displayed, which generate the display of the picture in the case of an appropriately matched illumination. In this case, the light source is such a matched illumination in particular. For example, in this case matched can relate to the frequency spectrum, the angular spectrum, and/or the centroid angle, at which the illumination takes place, and/or the coherence of the light (in space and/or time).

The fact that the display hologram and the light source are configured for the generation of the display of the picture in the case of the illumination by the light source preferably means that, on the one hand, the light source comprises a matched illumination and, on the other hand, the light source and display hologram are designed and positioned relative to one another such that the light source can appropriately illuminate the display hologram at least in part. In this case, the light source may preferably comprise a beam-shaping component, for example a lens, in order for example to appropriately collimate the emitted light beams. Moreover, this means that the light source and display hologram are matched to one another in respect of the angular spectrum of the light beams incident on the display hologram, in respect of the centroid angle of the light beams incident on the display hologram, in respect of the frequency spectrum of the light beams incident on the display hologram, and/or in respect of the coherence of the light beams incident on the display hologram. Thus, the pieces of picture information generated by the picture generator can particularly advantageously be displayed by the display hologram.

A display signal is preferably a signal that causes the light source to be switched on. In particular, this may be an electrical signal.

By preference, the light source may comprise a plurality of LEDs and/or lasers in order to generate displays with different brightnesses and/or colors. For example, the display signal may in this case comprise a plurality of display signals, which can preferably be generated independently of one another in a targeted fashion, for example in order to obtain an animated display.

In a further preferred example embodiment, the system comprises a picture generator for generating at least one projectable picture upon reception of a picture generating signal and at least one projection hologram which is comprised by the transparent main body and serves for the first display, wherein the control device is configured to output to the picture generator the picture generating signal in the case of the object-based authorization and/or the person-based authorization, and wherein the projection hologram and the picture generator are configured for the generation of the display of the picture, especially in the case of the generation of the projectable picture by the picture generator.

A picture generator for generating at least one projectable picture is a component which by preference itself generates the pieces of picture information contained in the picture to be displayed. In this case, the pieces of picture information can be guided in the form of light beams to the projection hologram, where the picture to be displayed is then generated, preferably as a real and/or virtual picture, which is visible from the display region. For example, the picture generator may comprise a picture generating unit (PGU) and/or a (video) projector, and a projection and/or picture template, at least one light source for illuminating the template, and/or at least one beam-shaping component, for example a lens. It may also be a laser projector which preferably does not require a picture template but generates the picture by targeted control of at least one laser beam.

The picture generator generates the pieces of picture information displayable by the projection hologram, in particular upon reception of a picture generating signal. In particular, a picture generating signal may comprise an electromagnetic signal. By preference, the picture generating signal may comprise the pieces of picture information to be generated, which are subsequently generated by the picture generator.

The at least one projection hologram which is comprised by the transparent main body and serves for the first display is in particular a diffuser area, on which the pieces of picture information are projected or transferred, by preference in a manner analogous to a "conventional" projection screen, so that a real and/or virtual picture becomes observable from the display region.

The control device is configured to output to the picture generator the picture generating signal in the case of the object-based authorization and/or the person-based authorization. In this case, a display appropriate for the respective authorization can be output.

The projection hologram and picture generator are configured for the generation of the display of the picture, especially in the case of the generation of the projectable picture by the picture generator. By preference, this means that the light beams emitted by the picture generator at least in part also reach the projection hologram. Moreover, this means that the picture generator and projection hologram are matched to one another in respect of the angular spectrum of the light beams incident on the projection hologram, in respect of the centroid angle of the light beams incident on the projection hologram, in respect of the frequency spectrum of the light beams incident on the projection hologram, and/or in respect of the coherence of the light beams incident on the projection hologram. Thus, the pieces of picture information generated by the picture generator can particularly advantageously be displayed by the projection hologram.

It may be preferable for the picture to comprise a dynamically displayed picture content, for example for displaying a holographic operating element and/or an animation.

In a further preferred example embodiment, a second display hologram is comprised by the transparent main body and configured to generate the display by means of an illumination from an ambient light of the hologram. Thus, in addition to at least one display initiated by a signal of the control device, it is possible to generate a display generated purely by the ambient light, this display for example labeling the detection region.

In a second aspect, the invention relates to a system for a door opener controller of a door or hatch having a functionalized pane, comprising a transparent main body having a front side and a back side for the functionalized pane, a first holographic display for a display of a picture, directed at a person, in a defined first display region vis-à-vis the front side and/or the back side of the transparent main body, a control device, and a first communications means for transmitting and receiving signals.

In this case, the first communications means and the control device are configured for an object-based authorization verification of an assigned, second communications means for transmitting and receiving signals, especially if the latter is situated within the transmission and reception range of the first communications means, wherein the object-based authorization verification is based on a position and/or movement of the second communications means in relation to a specified near region of the first communications means and on properties of signals exchanged between the first and second communications means, wherein the holographic display and control device are configured to generate the display of the picture in the case of the object-based authorization of the second communications means, and wherein the control device is moreover configured to output an unlock signal for an opening of the door in the case of at least an object-based authorization.

According to this aspect, the authorization can advantageously lead to the generation of a display of a picture in addition to the door being unlocked, for example in order to display the position of the operator control component and/or display a holographic operator control component. It is likewise possible to superimpose further important pieces of information, for example, in the case of a vehicle, the charge status of the battery or the tank fill level, or traffic information, for example in the morning for the commute to work. This can improve the operability, the security is increased, and the efficiency in the case of the respective application is increased.

The holographic display being comprised by the system by preference means that suitable means for generating a holographic display are comprised by the system. These suitable means are described sufficiently within this document.

The holographic display and the control device being configured to generate the display of the picture in the case of the object-based authorization of the second communications means can also mean that a new display of a picture is generated, for example a new picture can be generated, with a different picture having been displayed prior to the authorization.

By preference, the holographic display is a display with visible light, in particular in a wavelength range between 420 nm and 750 nm.

By preference, the holographic display (also according to the first aspect) generates a real and/or virtual picture, in particular a floating picture.

The advantages, definitions, and embodiments of the apparatus as per the first aspect likewise apply to the apparatus according to the second aspect. For example, the explanations regarding the system, the functionalized pane, and the transparent main body, which were described above, likewise apply to the apparatus according to the second aspect.

In a preferred example embodiment, the system comprises a light source for illuminating at least one first display hologram, which is comprised by the transparent main body, upon reception of a display signal, wherein the control device is configured to output to the light source the display signal in the case of the object-based authorization, and wherein the display hologram and the light source are configured for the generation of the display of the picture in the case of the illumination, especially of the display hologram, by the light source.

The display hologram being comprised by the transparent main body by preference means that the display hologram is arranged on or in the main body. Prior to the arrangement, for example, display hologram and transparent main body may form two separate components.

In a further preferred example embodiment, the system comprises a picture generator for generating a projectable picture upon reception of a picture generating signal and at least one first projection hologram which is comprised by the transparent main body, wherein the control device is configured to output to the picture generator the picture generating signal in the case of the object-based authorization of the second communications means, wherein the projection hologram and the picture generator are configured for the generation of the display of the picture, especially in the case of the generation of the projectable picture by the picture generator. By way of example, the position of the operator control component can be displayed by the display, or the holographic operator control component itself can be displayed.

In the embodiment with a light source and in the embodiment with a picture generator, the respective hologram can be illuminated in different ways: it is possible to select a free-beam illumination which is directed directly at the hologram from outside the main body; there can be an illumination through the main body, with the latter serving as a light guide by virtue of the illumination beams being guided by way of total-internal reflection for example; and there can be an edge lit illumination of the hologram by the light guide. By preference, this likewise applies to the embodiments of the holographic display according to the first aspect.

In a further preferred example embodiment, the system furthermore comprises at least one holographic camera for a stereoscopic picture recording of a defined detection region vis-à-vis the front side and/or the back side of the transparent main body, wherein the holographic camera comprises at least one recording hologram which is comprised by the main body and serves to divert light beams from the detection region, wherein the camera and the control device are configured for a person-based authorization verification of a person recorded by the stereoscopic picture recording, wherein the person-based authorization verification is based on at least one property of the person establishable by the stereoscopic picture recording, and wherein the control device is configured to output an unlock signal for an opening of the door in the case of the object-based authorization and the person-based authorization. This allows a two factor authorization to be implemented.

In a further preferred example embodiment, the control device is configured to enable a person-based authorization verification only after an object-based authorization.

A further preferred example embodiment comprises a closure component which is configured for locking or unlocking the door, wherein the closure component is configured for an unlocking of the door when the unlock signal is output by the control device.

A further preferred example embodiment comprises an operator control component which is configured for an operation of the door by the person.

In a further preferred example embodiment, the operator control component is configured for an activation of the operator control component when the unlock signal is output by the control device.

In a further preferred example embodiment, the operator control component comprises a proximity sensor on the basis of ultrasound, an optical sensor a wireless communications interface, and/or radar.

In a further preferred example embodiment, the operator control component comprises at least one capacitive sensor. Capacitive sensors are known for example from touchscreens and have a particularly simple and reliable operation.

In a further preferred example embodiment, the operator control component comprises a holography-based operator control component.

In a further preferred example embodiment, the system comprises at least one second holographic display for a display of a picture directed at a person, wherein the second holographic display is configured to generate the display of the picture in the case of a specified illumination from an ambient light of the transparent main body.

In a further preferred example embodiment, the system comprises at least one second display hologram which is comprised by the transparent main body, serves for the display of the picture directed at the person, and is configured to generate the display by means of an illumination from an ambient light of the hologram.

In a further preferred example embodiment according to the first aspect or the second aspect, the display comprises a display of an operator control component and/or an operation request for the operator control component and/or a display of a desired detection position for the person in the detection region. By preference, the desired detection position is encompassed by the detection region.

In a further preferred example embodiment according to the first aspect or the second aspect, the holographic camera comprises at least one image sensor, wherein the recording hologram, transparent main body, and image sensor are configured for an at least partial light transmission between the recording hologram and the image sensor by way of light beams guided in the main body.

At least one image sensor can also be referred to as detector and/or detector system, wherein a detector system can by preference comprise at least two image sensors.

By preference, the recording hologram can in this case divert the light to be recorded from the detection region such that said light is guided to the image sensor through the main body. For example, the light can be input coupled via an external surface of the main body associated with an extensive part and can then be guided by the recording hologram in the direction of the image sensor which for example is present arranged on a short lateral external surface of the main body not associated with the extensive part. In this case, the light can be guided directly, which is to say without further reflections in particular, to the image sensor. However, it is likewise possible for the light to be diverted at such an angle into the main body by the recording hologram that this light is guided to the image sensor under at least one total-internal reflection at an external surface of the main body. In this way, the main body can advantageously act as a light guide.

In a further preferred example embodiment according to the first aspect or the second aspect, the transparent main body furthermore comprises at least one first output coupling hologram which is configured to output couple the guided light beams out of the transparent main body in the direction of the image sensor. This can obtain great flexibility with regards to the arrangement of the image sensor.

In an embodiment, the system comprises a functionalized waveguide for a detector system, wherein the waveguide comprises a transparent main body having a front side and a back side, wherein the main body comprises a partly transparent input coupling region and an output coupling region spaced apart therefrom in a first direction (R1), wherein the input coupling region, as recording hologram, comprises a diffractive structure which diverts only a portion of radiation coming from an object to be detected, in particular in the detection region, and incident on the front side, such that the diverted portion propagates as input coupled radiation in the main body as far as the output coupling region by means of reflections and is incident on the output coupling region, wherein the output coupling region diverts at least one portion of the input coupled radiation incident thereon, such that the diverted portion emerges from the main body via the front side or back side in order to be incident on the detector system. In this case, the output coupling region preferably comprises a diffractive structure for diversion purposes, in particular an output coupling hologram. In this case, the extent of the input coupling region in a second direction (R2) across the first direction (R1) is preferably greater than the extent of the output coupling region (5) in the second direction (R2).

In a further preferred example embodiment according to the first aspect or the second aspect of the system, the holographic camera is configured for a stereoscopic picture recording of a monochrome picture, a multicolored picture, and/or an infrared picture. By preference, monochrome means that the picture recording makes use of a frequency spectrum which is generally perceived as "single colored", for example red. A single colored picture can be realized using particularly simple and cost-effective components. A multicolor picture may comprise a continuous spectrum in the visible range; however, it may likewise be a picture composed of a plurality of colors. For example, the RGB (red, green, blue), CMY (cyan, magenta, yellow), and/or CMYK (additionally black) color spaces can be used for the picture recording. To this end, use can be made of suitable holograms, for example a hologram stack and/or multiplex holograms (see above). By way of example, more pieces of picture information can be realized by way of such multicolored picture recordings, and it is advantageously possible to obtain increased security in the authorization verification.

In particular, an infrared picture is a picture generated by recording near infrared radiation. By preference, near infrared radiation is radiation in a wavelength range between 750 nm and 3 µm (micrometers), in particular between 780 nm and 1.4 µm. In particular, near infrared radiation is invisible to a person to be detected.

An infrared picture may likewise preferably comprise thermal radiation, which preferably encompasses the range of 3 µm to 50 µm. An infrared picture with thermal radiation in particular has the advantage that no residual and/or ambient light is required for the person-based authorization verification since the infrared radiation is generated in particular by the thermal radiation of the recorded person themselves. Hence, a person-based authorization verification can be undertaken without an additional illumination source and without a person being able to notice this, advantageously even at night.

In a further preferred example embodiment according to the first aspect or the second aspect, the first display hologram and the light source and/or the projection hologram and the picture generator are configured for an at least partial light transmission between display hologram and light source and/or projection hologram and picture generator, respectively, by way of light beams guided in the main body.

For example, the light source for illuminating the display hologram or the picture generator for illuminating the projection hologram can be present arranged at, for example, a short lateral external surface of the main body not associated with the extensive part and can radiate into the main body through this external surface (preferably what is known as an edge lit hologram). An input coupling component may be comprised to this end. In this case, the light can be guided directly, which is to say without further reflections in particular, to the display hologram or projection hologram. However, it is likewise possible for the light to be input coupled into the main body at such an angle in the direction of the display hologram or projection hologram that this light is guided to the display hologram or projection hologram under at least one total-internal reflection at an external surface of the main body. In this way, the main body can advantageously act as a light guide. In this case, the display hologram and/or the projection hologram by preference output couples the light in the direction of the display region. Another option for the arrangement of the picture generator or light source is the arrangement vis-à-vis the front side and/or back side of the main body. For the purpose of input coupling into the main body such that the light can be guided therein as described above, it is possible that a corresponding optical element is comprised, for example a diffractive element, in particular an input coupling hologram, or for example a reflective element, in particular a mirror, arranged within the main body.

In a further preferred example embodiment according to the first aspect or the second aspect, the picture generator and projection hologram and/or the light source and first display hologram are configured for a free-beam light transmission. In particular, this means that the light beams of the picture generator or light source are predominantly transmitted not in the main body but as a free beam from the picture generator or light source to the display hologram and/or projection hologram. This can realize a particularly simple technical solution, which can also be retrofitted well.

In a further preferred example embodiment according to the first aspect or the second aspect, the property establishable by the stereoscopic picture recording is a property suitable for an unambiguous identification of at least one specific person. Thus, a person-based authorization preferably only occurs if this at least one specific person is identified.

In a further preferred example embodiment according to the first aspect or the second aspect, the property establishable by the stereoscopic picture recording is a property suitable for assigning the person to a specific group of persons, especially for assignment to the group of adult persons and/or non-adult persons. For example, this allows a distinction to be made as to whether or not the person in the detection region is an adult person. For example, in that case it may be preferable for only an adult person to be authorized. For example, this would be particularly advantageous for a driver's door for access to the driver seat of a vehicle or for a bar door.

In a further preferred example embodiment according to the first aspect or the second aspect, the control device is configured to provide a data-based user profile on the basis of a person-based and/or object-based authorization, the user profile being linked to an authorized person. For example, this data-based user profile may consist of specified and/or learned data. For example, if the system is used for a driver's door, it may emerge from the data-based user profile that an identified person is an underaged driver, who may drive the vehicle only when accompanied by an adult person.

In a further preferred example embodiment according to the first aspect or the second aspect, a door opener is comprised which is configured to open a door in the case of the unlock signal by the control device and/or an open signal by the operator control component. For example, a door opener can be a component which, by the application of a force, brings the door from a closed state into an open state. For example, such a door opener may be electrically, magnetically, pneumatically, hydraulically, and/or mechanically driven. Thus, in the case of a simultaneous actuation system for pivoting open the door, a secure "hands-free" solution is possible, which is simple to operate and particularly hygienic.

In a further preferred example embodiment according to the first aspect or the second aspect, the second communications means is comprised which is configured for an arrangement in a portable component, preferably in a key. However, a portable component may likewise comprise a gimmicky object, for example a magic wand.

In a further aspect, provided is a communications means which is comprised in a portable component, preferably in a key, and which is configured for a use as a second communications means in a system according to the first or second aspect.

The advantages, definitions, and embodiments of the system as per the first and second aspect likewise apply to the communications means.

In a further aspect, provided is a door with the functionalized pane, comprising a system as disclosed herein.

The advantages, definitions, and embodiments of the system as per the first and second aspect likewise apply to the door.

In a preferred example embodiment, the door comprises a third holographic display. The third holographic display may be comprised in addition to or independent of a holographic display of the aforementioned system. For example, the third holographic display can be used to display an operator control component, in particular a door handle. The holographic display may have, mutatis mutandis, advantages, definitions, features, and embodiments like the holographic display of the system. By way of example, the holographic display can also be a passive display which is illuminated by ambient light. The holographic display can likewise be activated by a signal of the control device, as described above.

The door is for a vehicle in a preferred embodiment.

In particular, a vehicle is an automobile, a truck, and/or a rail-based vehicle, for example a train.

In addition to the embodiments already described here, such a door can also realize a child security lock if, for example, the door is a back side door and the system has established that a child has opened the door. For example, the door can be prevented from simply being opened again in that case. Opening may for example be rendered dependent on certain circumstances, for example the at least one camera can undertake traffic monitoring and the door can only be opened if there is no danger due to traffic.

The door is for a building in a further preferred embodiment. This may preferably be an external door or an internal door.

Similar to what was described above, a type of child security lock can also be realized for a building door, which prevents an uncontrolled exit of children to in front of the door.

In a further preferred example embodiment, the door is for a domestic appliance, in particular for an oven, a refrigerator, a washing machine, a cupboard, a liquor cupboard, a firearms locker, a tumble dryer, and/or a microwave. Thus, for example, an opening of an oven or washing machine door can be realized by rejecting a person-based authorization.

In a further aspect, provided is a vehicle, comprising at least a door as described and/or a system according to the first or second aspect as described.

The advantages, definitions, and embodiments of the system as per the first and second aspect and door likewise apply to the vehicle.

In a preferred example embodiment, the vehicle and/or the control device is configured to adjust at least one user-specific setting of the vehicle on the basis of the user profile of the authorized person. For example, this may mean that the control device outputs at least one appropriate output signal, by means of which the setting is realized, for example by way of further vehicle components. For example, this setting can be the preferred seat position of an identified person, which for example is set by an electrical seat adjuster on account of the output signal of the control device. This might also relate to a limiting of the top speed, which should not be exceeded by a novice driver, realized by way of the onboard electronics of the vehicle. A further example would be the granting of permission for an underaged learner driver to start the vehicle only when accompanied by a parent (who for example was identified within the scope of a person-based authorization verification at the front passenger's door). For example, the mirror settings or further settings can be adjusted and, for example, it is possible to implement driver recognition using a person-related driver profile.

In a further aspect, provided is a building, comprising at least a door as described and/or a system according to the first or second aspect as described.

The advantages, definitions, and embodiments of the system as per the first and second aspect and door likewise apply to the building.

For example, it is possible to implement access control in industry and for companies with elevated security, while simultaneously having minimal operator outlay.

In a preferred example embodiment, the building and/or the control device is configured to adjust user-specific settings of the building on the basis of the user profile of the authorized person. In a manner analogous to the settings described above in relation to the vehicle, it is possible to adjust settings, for example a specific heating profile of the heating or the clearance or blocking of certain appliances present in the building (PC, television, etc.) or of rooms. For example, for residential communities, the access to individual rooms can be realized by a person-based authorization of individual rooms.

In a further aspect, provided is a domestic appliance, comprising a door as described and/or a system according to the first or second aspect as described. For example, a child security lock for an oven can thus be realized. For example, an access can be granted only for specific persons.

In a preferred example embodiment, the domestic appliance and/or the control device is configured to adjust user-specific settings of the domestic appliance on the basis of the user profile of the authorized person. In this case, settings can be adjusted in a manner analogous to the adjustment of settings described above in relation to the vehicle or the building. For example, in the case of a refrigerator, certain agreed use times for children can be verified or secured, for example in order to prevent uncontrolled "snacking" between meals. It is possible to obtain a personalization and an implementation of certain temporal user profiles, by virtue of access being granted to certain persons or all persons at specific times only. For example, a controlled access (only for certain persons and/or at certain times) can be realized.

In a further aspect, provided is a method for a door opener control system of a door or hatch having a functionalized pane, wherein the system comprises a transparent main body having a front side and a back side for the functionalized pane, at least one holographic camera for a stereoscopic picture recording of a defined detection region vis-à-vis the front side and/or the back side of the transparent main body, wherein the holographic camera comprises at least one recording hologram which is comprised by the main body and serves to divert light beams from the detection region, and a control device. In this case, the method comprises the steps of: undertaking a person-based authorization verification of a person recorded by the stereoscopic picture recording by the camera and the control device, the person-based authorization verification being based on at least one property of the person establishable by the stereoscopic picture recording, and outputting an unlock signal for an opening of the door by the control device in the case of at least a person-based authorization.

The, definitions, and embodiments of the apparatuses, for example for the system as per the first or second aspect, likewise apply to the method, and vice versa.

In a preferred example embodiment, the system furthermore comprises a first communications means for transmitting and receiving signals. In this case, the method comprises the following steps:

establishing a signal exchange with an assigned, second communications means for transmitting and receiving signals if the latter is situated within the transmission and reception range of the first communications means, undertaking an object-based authorization verification by the control unit and first communications means on the basis of a position and/or movement of the second communications means in relation to a specified near region of the first communications means and the properties of exchanged signals, and outputting an unlock signal by the control unit for an opening of the door in the case of the person-based authorization and an object-based authorization of the second communications means in the object-based authorization verification.

Establishing a signal exchange with an assigned, second communications means for transmitting and receiving signals if the latter is situated within the transmission and reception range of the first communications means is preferably comprised if the description above states that the first communications means and control device are configured for an object-based authorization verification of an assigned, second communications means for transmitting and receiving signals. For example, this step can be realized by virtue of the first communications means regularly emitting a signal. Then, if an assigned second communications means is situated in the transmission and reception range, it can in turn emit a response signal which is received by the first communications means. Only after this communications signal has been received is it then possible, preferably by the first communications means, to initiate a signal exchange which can be subsequently used for the object-based authorization verification.

In a preferred example embodiment, the person-based authorization verification is only carried out after an object-based authorization.

In a preferred example embodiment, the system furthermore comprises a closure component which is configured for locking or unlocking the door, wherein the closure component undertakes an unlocking of the door when the unlock signal is output by the control device.

In this case, it may be preferable for the closure component to otherwise be closed or in a locked state.

In a further preferred example embodiment, the system furthermore comprises an operator control component which is configured for an operation of the door by the person, wherein the operator control component is activated when the unlock signal is output by the control device.

In a further preferred example embodiment, the system furthermore comprises at least one first holographic display for a display of a picture, directed at a person, in a defined display region vis-à-vis the front side and/or the back side of the transparent main body, wherein the control device outputs a picture generating signal to the holographic display in the case of an object-based and/or person-based display, and the holographic display displays a picture corresponding to the picture generating signal, preferably for a display of an operator control component, a display of an operation request for the operator control component, and/or a display of a desired detection position for the person in the detection region. For example, this can be realized by virtue of the picture generating signal being supplied to a picture generator and/or a light source for illuminating a corresponding hologram, in particular a projection hologram and/or display hologram. The picture generating signal can preferably also correspond to a display signal (see above).

In a further preferred example embodiment, the system furthermore comprises a door opener for opening a door, wherein the door opener opens a door in the case of an unlock signal by the control device and/or an open signal by the operator control component.

In a further preferred example embodiment, the property of the person establishable by the person-based authorization verification is an individual property which allows the identification of at least one specific person.

In a further preferred example embodiment, the property of the person establishable by the person-based authorization verification is a property suitable for assigning the person to a specific group of persons, especially for assignment to the group of adult persons and/or non-adult persons.

In a further preferred example embodiment, the control device provides a data-based user profile on the basis of a person-based and/or object-based authorization, the user profile being linked to an authorized person, and preferably at least one further output signal that is dependent on the user profile is generated by the control device on account of said user profile. That in particular involves a plurality of output signals.

In a further aspect, provided is a method for a door opener control system of a door or hatch having a functionalized pane, wherein the system comprises a transparent main body having a front side and a back side for the functionalized pane, a first holographic display for a display of a picture, directed at a person, in a defined first display region vis-à-vis the front side and/or the back side of the transparent main body, a control device, and a first communications means for transmitting and receiving signals. The method comprises the following steps:

establishing a signal exchange with an assigned, second communications means for transmitting and receiving signals if the latter is situated within the transmission and reception range of the first communications means, undertaking an object-based authorization verification by the control unit and first communications means on the basis of a position and/or movement of the second communications means in relation to a specified near region of the first communications means and the properties of exchanged signals, outputting a picture generating signal to the holographic display by the control device in the case of an object-based and/or person-based authorization, displaying a picture corresponding to the picture generating signal by the holographic display, preferably the display of an operator control component, a display of an operation request for the operator control component and/or a display of a desired detection position for the person in the detection region, outputting an unlock signal by the control unit for an opening of the door in the case of at least one object-based authorization of the second communications means.

The advantages, definitions, and embodiments of the apparatuses, for example of the system as per the first and second aspect and as per the first method, likewise apply to the second method, and vice versa.

The picture generating signal can preferably also correspond to a display signal (see above). The picture generating signal can be supplied to a picture generator and/or a light source for illuminating a corresponding hologram, in particular a projection hologram and/or display hologram.

In a preferred example embodiment, the system furthermore comprises at least one holographic camera for a stereoscopic picture recording of a defined detection region vis-à-vis the front side and/or the back side of the transparent main body, wherein the holographic camera comprises at least one recording hologram which is comprised by the main body and serves to divert light beams from the detection region, wherein the method furthermore comprises the following steps:

undertaking a person-based authorization verification of a person recorded by the stereoscopic picture recording by the camera and the control device, the person-based authorization verification being based on at least one property of the person establishable by the stereoscopic picture recording, outputting an unlock signal for an opening of the door by the control device in the case of a person-based and an object-based authorization.

In a further preferred example embodiment, the person-based authorization verification is only carried out after an object-based authorization.

In a further preferred example embodiment, the system furthermore comprises a closure component which is configured for locking or unlocking the door, wherein the closure component undertakes an unlocking of the door when the unlock signal is output by the control device.

In a further preferred example embodiment, the system furthermore comprises an operator control component which is configured for an operation of the door by the person, wherein the operator control component is activated when the unlock signal is output by the control device.

In a further preferred example embodiment, the system furthermore comprises a door opener for opening a door, wherein the door opener opens a door in the case of an unlock signal by the control device and/or an open signal by the operator control component.

In a further preferred example embodiment, the property of the person establishable by the person-based authorization verification is an individual property which allows the identification of at least one specific person.

In a further preferred example embodiment, the property of the person establishable by the person-based authorization verification is a property suitable for assigning the person to a specific group of persons, especially for assignment to the group of adult persons and/or non-adult persons.

In a further preferred example embodiment, the control device provides a data-based user profile on the basis of a person-based and/or object-based authorization, the user profile being linked to an authorized person, and preferably at least one further output signal that is dependent on the user profile is generated by the control device on account of said user profile. That preferably involves a plurality of output signals.

BRIEF DESCRIPTION OF THE DRAWINGS

The invention will be explained below with reference to further figures and examples. The examples and figures serve for illustrating a preferred embodiment of the invention without limiting the latter.

DETAILED DESCRIPTION

Figure 1:
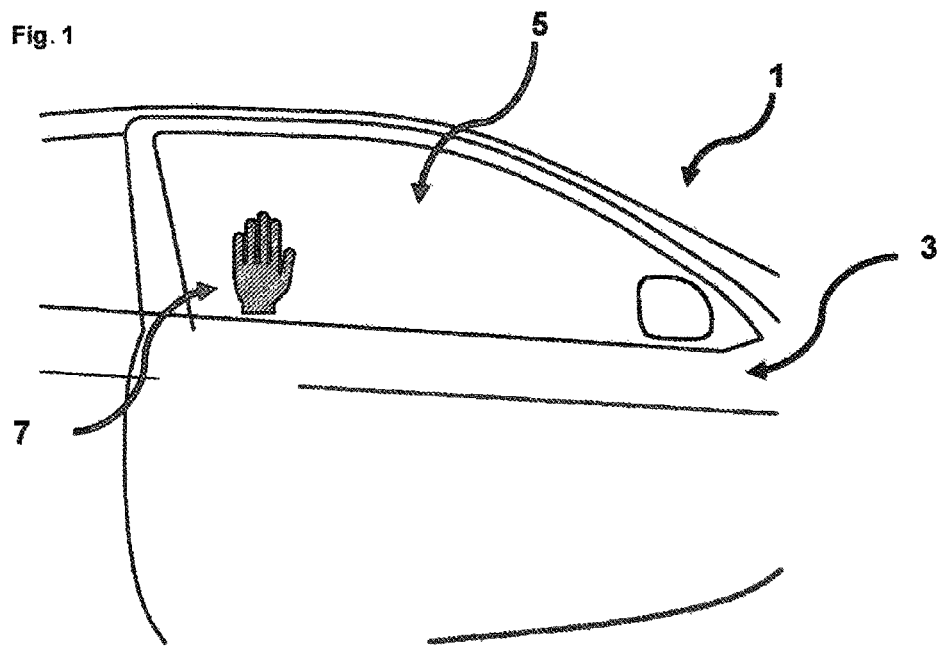
FIG. 1 shows a vehicle door having a system for object-based authorization verification and a holographic display for a holographic operator control component.

FIG. 1 shows a portion of a vehicle 1 having a door 3, which comprises a system for object-based authorization verification as described here. The functionalized pane 5 has a corresponding transparent main body. The functionalized pane 5 is typically formed by the transparent main body. A holographic display 7 is generated if an object-based authorization is established. In this case, this relates to a holographic operator control element, which by way of a holographically displayed hand indicates where the authorized person should place their hand for the purpose of opening the door 3.

Figure 2:
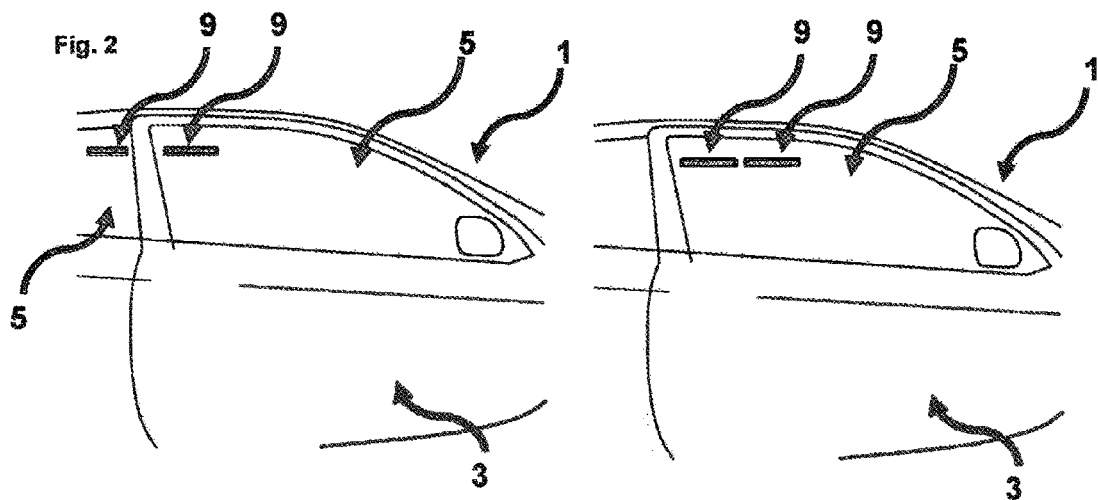
FIG. 2 shows possible arrangements of the holographic cameras in a vehicle door.

FIG. 2 shows, both on the left and on the right, a portion of a vehicle 1 having a door 3. Shown here are two recording holograms 9 for two holographic cameras, which are used for the stereoscopic picture recording in order to carry out the person-based authorization verification.

In this context, two functionalized panes 5 are used in the left-hand picture, a front side window between A-pillar and B-pillar and a back side window behind the B-pillar, and each comprise a transparent main body with a recording hologram 9.

Only the front side window is a functionalized pane 5 in the right-hand picture and comprises both recording holograms 9 of the two holographic cameras.

Figure 3:
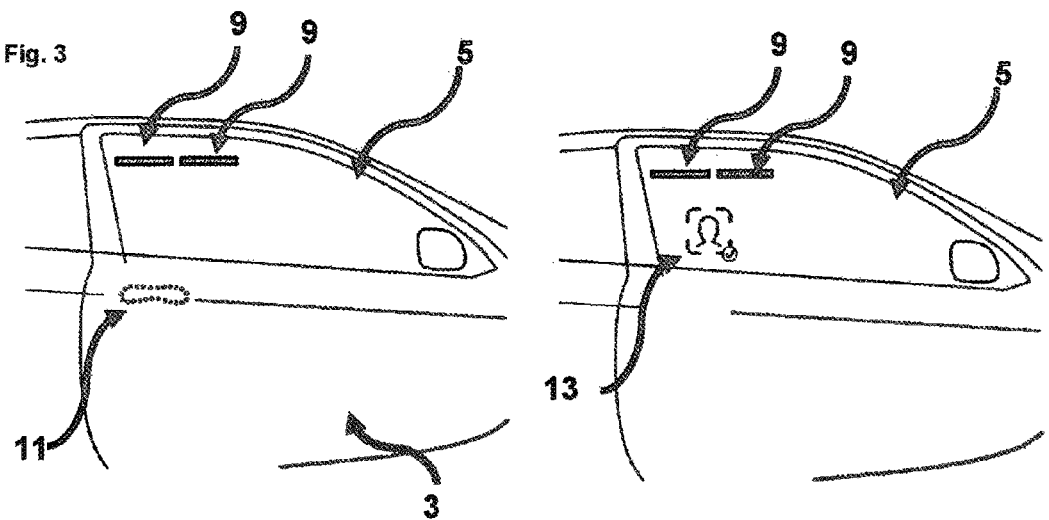
FIG. 3 shows a passive holographic display in a vehicle door, excited by ambient light.

FIG. 3 shows an exemplary embodiment of a vehicle door having a functionalized pane 5, which comprises two recording holograms 9 for stereoscopic picture recording. In this case, two examples are shown, on the left and on the right, where a holographic display of an operator control component 11 can be generated from an illumination by ambient light.

In the example on the left, this "passive" holographic display of the operator control component 11 is not part of the functionalized pane 5, but rather of the door 3, and shows the position of an operator control component, the door handle in this case. By preference, this "passive" holographic display is visible in the display region.

The example on the right comprises a holographic display of a desired detection position 13, here by preference likewise as a "passive" hologram which is only illuminated by ambient light. The holographic display of the desired detection position 13 by preference is visible from the display region and for example indicates to a person in front of the door where they have to position themselves and in what direction they have to look.

In the case of an active hologram, it is likewise conceivable that the holographic display of the detection position 13 is realized by a display hologram comprised by the functionalized pane 5, said display hologram being designed such that it has a different color depending on the position of the observer. For example, it is conceivable that the display is visible in red to a person in the display region who is not positioned at the detection position, with the display 13 changing color and appearing green in the case of a change of position to the detection position.

Figure 4:
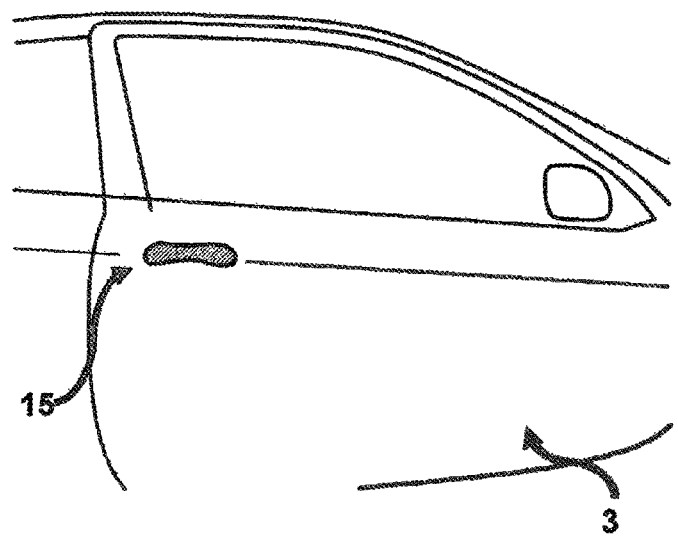
FIG. 4 shows the display of an operator control component following the person-based authorization in a vehicle door.

FIG. 4 shows an exemplary embodiment of a vehicle door 3, wherein, for example following an object-based authorization, a holographic operator control component 15 is displayed. Here, this holographic operator control component 15 is a part of the door 3.

Figure 5:
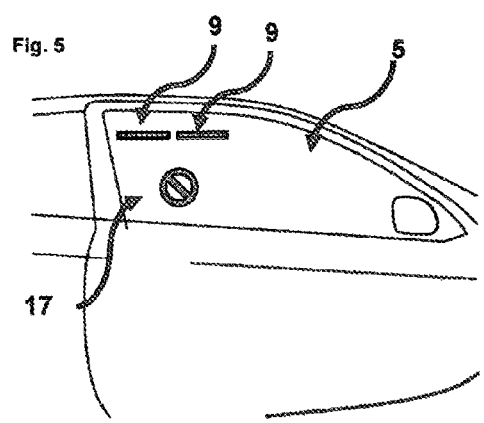
FIG. 5 shows the holographic display on account of an access denial.

FIG. 5 shows a vehicle door having a functionalized pane 5 comprising two recording holograms 9 and a holographic display 7, the latter displaying a symbol denoting an access denial. For example, the latter can be displayed in the case of an unsuccessful object-based and/or person-based authorization verification.

Figure 6:
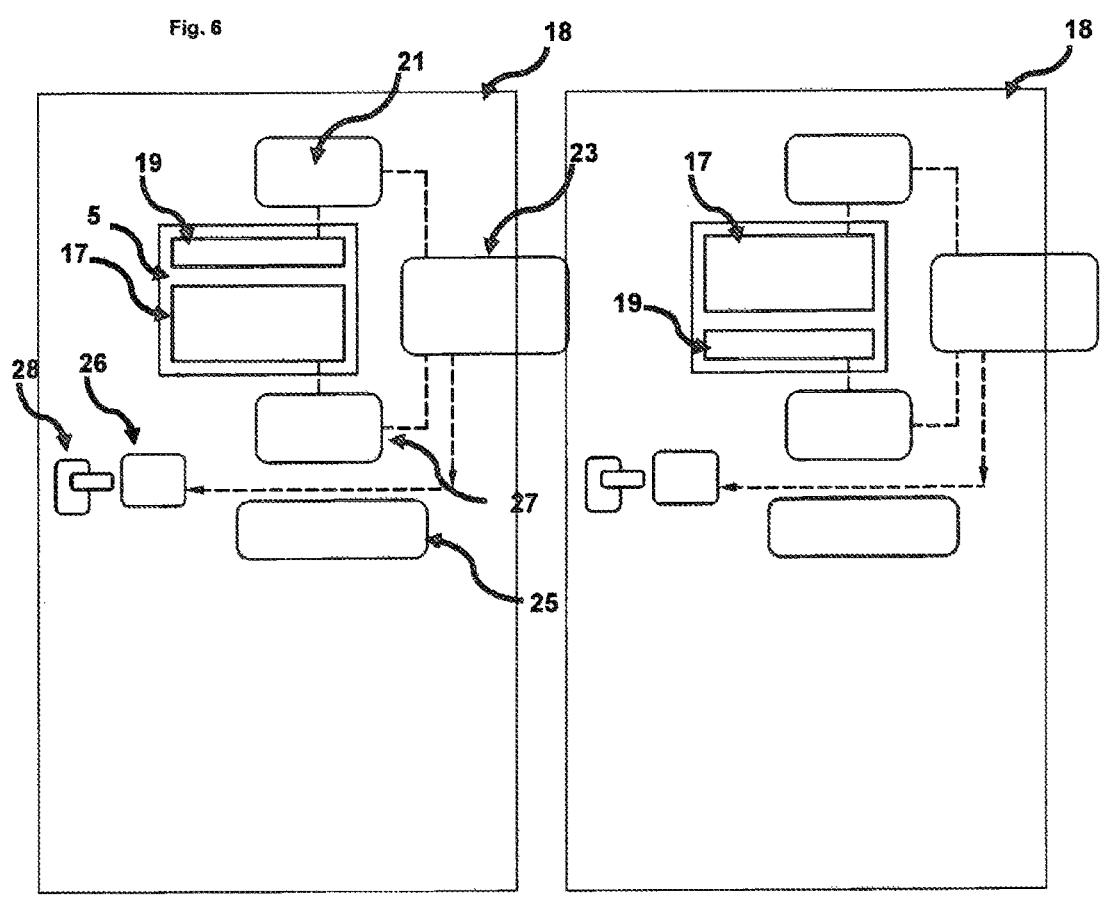
FIG. 6 shows two different exemplary embodiments for a house door having the described system.

FIG. 6 shows two different exemplary embodiments of a house door 18 having the described system. At least one holographic camera 19 for a stereoscopic picture recording (by preference there are at least two cameras) is comprised in the functionalized pane 5, which as it were enables a view from outside through the door 18 into the interior behind the door 18. The holographic camera 19 feeds a camera signal 21 to the control device 23 which, in turn, carries out the further steps of the authorization verification on the basis of the picture recordings and, for example, outputs an unlock signal 25 (the signal path is represented by the dashed arrow) to the closure component 26 in the case of an authorization. In this case, the closure component 26 is comprised by a door lock with a door handle as operator control component 28. Moreover, the control device can output a picture generating signal or a display signal 27, by means of which a holographic display 7 is initiated. For example, the holographic display 7 can indicate to a person entering the number of persons located inside. The difference between the left image and the right image consists in the arrangement of the holographic camera 19 and holographic display 7, with, on the left, the holographic camera 19 being located at the top and the holographic display 7 being located at the bottom, and the situation being reversed on the right. There is much flexibility here on account of the setup of the system.

Figure 7:
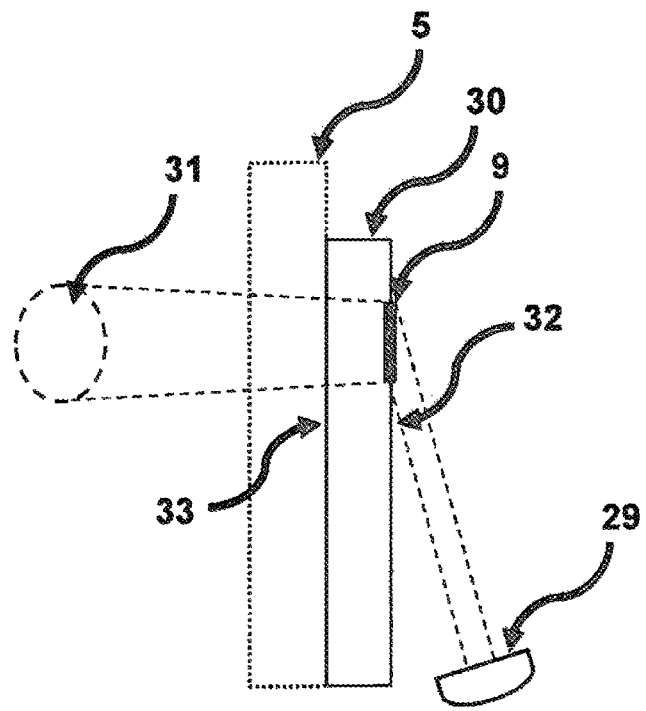
FIG. 7 shows an embodiment of a holographic camera in a side view.

FIG. 7 shows an embodiment of a holographic camera in a side view. Light beams from a defined detection region 31 vis-à-vis the front side 33 of the transparent main body 30 are diverted by the recording hologram 9 in the direction of an image sensor 29. In this embodiment, the transmission of the light beams between recording hologram 9 and image sensor 29 is implemented as a "free beam" outside of the main body 30. At the same time, the recording hologram may have imaging properties. The recording hologram 9 can be present attached to the transparent main body 30, for example in the form of a coating or a film. As it were, the transparent main body can act as a functionalized pane 5. However, a separate pane 5 (drawn in dotted lines) which is functionalized as a result of the arrangement of the transparent main body 30 thereon may be comprised.

Typically, two holographic cameras, as shown in FIG. 7 (or else in FIG. 8 and FIG. 9), would be comprised for a stereoscopic picture recording.

Figure 8:
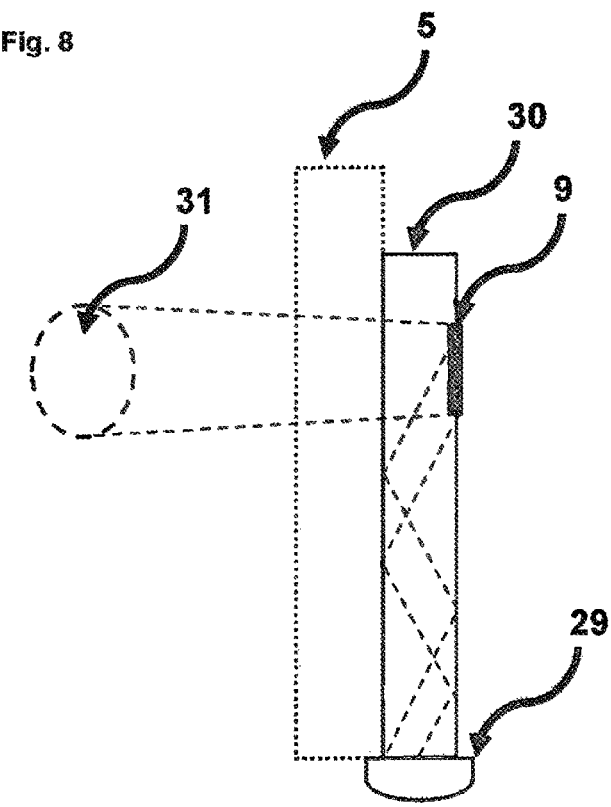
FIG. 8 shows a further embodiment of a holographic camera in a side view.

FIG. 8 shows a further embodiment of a holographic camera in a side view. Apart from the light guidance, described below, between recording hologram 9 and image sensor 29, the setup is substantially identical to that of FIG. 7; therefore, only these differences should be discussed here.

In the embodiment shown, the recording hologram 9 is designed such that the light beams are guided in the transparent main body 30 by total-internal reflection. In this case, the image sensor 29 is arranged at a lower short side face of the main body 30, whereto the light beams are guided by total-internal reflection. Naturally, in the case of an appropriate embodiment of the recording hologram 9, it would likewise be possible for the image sensor 29 to be arranged at the upper short side face of the main body 30. If a separate functionalized pane 5 (drawn in dotted lines) is comprised, a difference in the refractive index enabling the total-internal reflection in the main body 30 must be implemented between said pane and the main body 30. For example, said refractive index difference can be realized by a layer, in particular by a film with the corresponding properties, which is situated between the pane 5 and the main body 30. It would likewise be possible for an air gap to be situated therebetween.

Figure 9:
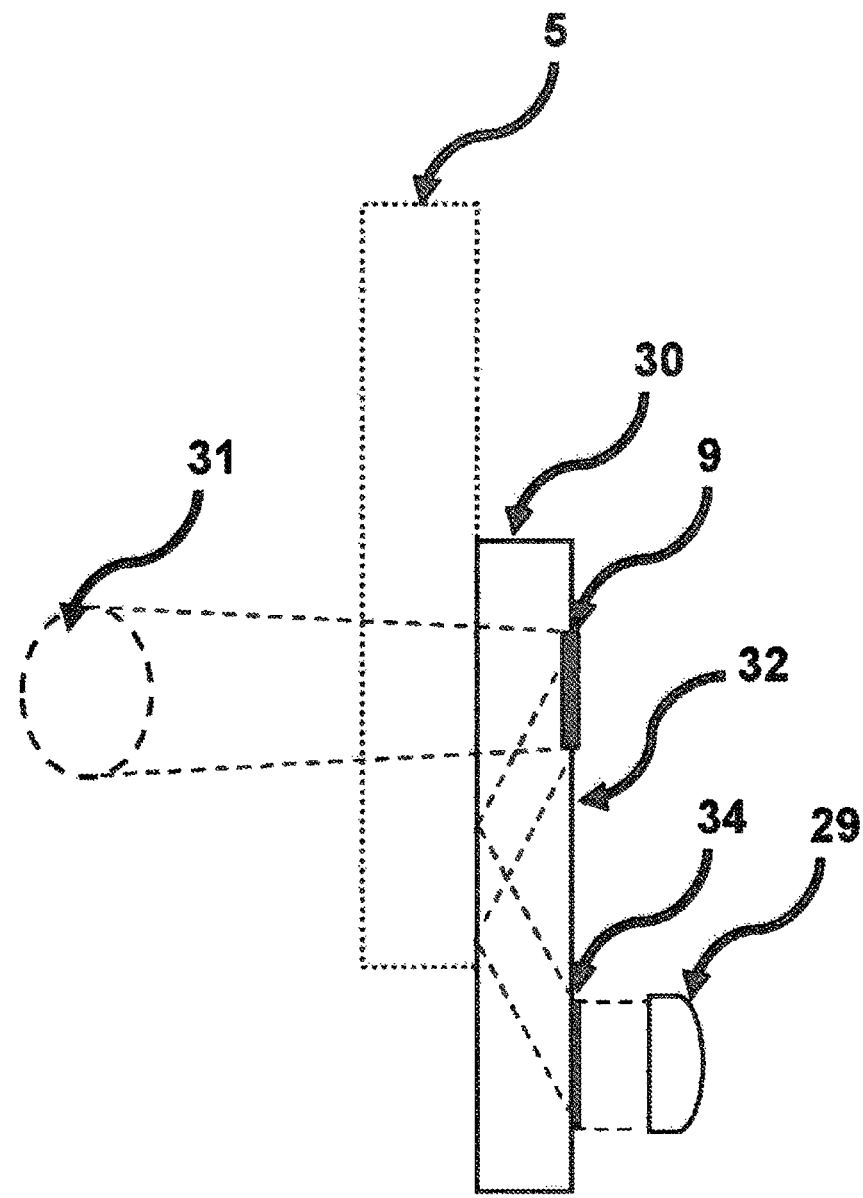
FIG. 9 shows a further embodiment of a holographic camera in a side view.

FIG. 9 shows an embodiment of a holographic camera in a side view. Apart from the output coupling of the light beams toward the image sensor 29, the setup is substantially identical to that of FIG. 8 and, apart from the differences of FIG. 8 with respect to FIG. 7, identical to the latter; therefore, only the differences should be discussed here. In the case of the main body 30 according to FIG. 8 as well, the light beams are guided by total-internal reflection in the main body 30. However, in the example shown, the image sensor 29 is arranged on a back side 32 of the main body and, by way of an output coupling hologram 34, the guided light beams are output coupled from the main body 30 and directed at the image sensor 29. In this case, the output coupling hologram 34 may have imaging properties. In a manner similar to the recording hologram 9, the output coupling hologram 34 can be applied to or integrated in the main body 30. The image sensor can also be arranged on a front side of the main body 30. The output coupling hologram 34 may comprise a transmissive or reflexive hologram. If a separate functionalized pane 5 (drawn in dotted lines) is comprised, the part of the main body 30 where the recording hologram 34 and image sensor 29 are present can be arranged below or above (if the image sensor is arranged at an upper end of the main body 30) a lower or upper end, respectively, of the pane 5 such that looking through the pane 5 is not impaired by the image sensor 29 in particular, or the latter cannot be seen.

In a manner analogous to what was described above in FIGS. 7, 8 and 9, the analogous functionality of a holographic display 7 can be described on the basis of these figures. However, in that case the image sensor 29 would be replaced by a light source or a picture generator, the use of a recording hologram 9 would be replaced by the use of a display or projection hologram, the detection region 31 could for example correspond to the display region, the output coupling hologram 34 would be an input coupling hologram instead, and overall the course of the beams would run in the opposite direction.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

LIST OF REFERENCE SIGNS

1 Vehicle
3 Vehicle door
5 Functionalized pane
7 Holographic display
9 Recording hologram
11 Holographic display of the operator control component
13 Holographic display of the detection position
15 Holographic operator control component
18 Entrance door to a building
19 At least one holographic camera for stereoscopic picture recording
21 Camera signal
23 Control device
25 Unlock signal
26 Closure component
27 Picture generating signal or display signal
28 Operator control component
29 Image sensor
30 Transparent main body
31 Defined detection region
32 Back side of the transparent main body
33 Front side of the transparent main body
34 Output coupling hologram

The invention claimed is:

1. A system for a door opener controller of a door or hatch having a functionalized pane, comprising:
a transparent main body having a front side and a back side for the functionalized pane;
at least one holographic camera for a stereoscopic picture recording of a defined detection region vis-à-vis the front side and/or the back side of the transparent main body; and
a control device,
wherein the at least one holographic camera comprises at least one recording hologram which comprises a main body and serves to divert light beams from the detection region,
wherein the holographic camera and the control device are configured for a person-based authorization verification of a person recorded by the stereoscopic picture recording, the person-based authorization verification being based on at least one property of the person that is establishable by the stereoscopic picture recording, and
wherein the control device is configured to output an unlock signal for an opening of the door in the case of at least a person-based authorization.

2. The system of claim 1, further comprising:
a first communications means for transmitting and receiving signals,
wherein the first communications means and control device are configured for an object-based authorization verification of an assigned, second communications means for transmitting and receiving signals,
wherein the object-based authorization verification is based on a position and/or movement of the second communications means in relation to a specified near region of the first communications means and on properties of signals exchanged between the first and second communications means, and
wherein the control device is configured to output an unlock signal for an opening of the door in the case of the person-based authorization and an object-based authorization of the second communications means.

3. The system of claim 2, wherein the control device is configured to enable a person-based authorization verification only after an object-based authorization.

4. The system of claim 1, further comprising a closure component which is configured for locking or unlocking the door, wherein the closure component is configured for an unlocking of the door when the unlock signal is output by the control device.

5. The system of claim 1, further comprising an operator control component which is configured for an operation of the door by the person, wherein the operator control component is configured for an activation of the operator control component when the unlock signal is output by the control device.

6. The system of claim 5,
wherein the operator control component comprises a proximity sensor on the basis of ultrasound, an optical sensor a wireless communications interface, and/or radar, and/or
wherein the operator control component comprises a holography-based operator control component.

7. The system of claim 1, further comprising at least one first holographic display for a display of a picture directed at a person.

8. The system of claim 7, wherein the at least one holographic display comprises a display of an operator control component and/or an operation request for the operator control component and/or a display of a desired detection position for the person in the detection region.

9. The system of claim 7, wherein the at least one first holographic display is configured to generate the display in the case of an illumination from an ambient light of the transparent main body.

10. The system of claim 7, wherein the at least one holographic display and the control device are configured to generate the first display of the picture in the case of the object-based authorization and/or the person-based authorization.

11. The system of claim 1, wherein the holographic camera comprises at least one image sensor, wherein the recording hologram, transparent main body, and image sensor are configured for an at least partial light transmission between the recording hologram and image sensor by way of light beams guided in the main body.

12. The system of claim 1,
wherein the property establishable by the stereoscopic picture recording is a property suitable for an unambiguous identification of at least one specific person, and/or
wherein the property establishable by the stereoscopic picture recording is a property suitable for assigning the person to a specific group of persons, especially for assignment to the group of adult persons and/or non-adult persons.

13. The system of claim 1, further comprising a door opener configured to open a door in the case of the unlock signal by the control device and/or an open signal by the operator control component.

14. A door with a functionalized pane, for a vehicle, a building, and/or a domestic appliance, comprising the system of claim 1.

15. A method for a door opener control system for a door or hatch having a functionalized pane, the method comprising:
providing a door opener control system, comprising:
a transparent main body having a front side and a back side for the functionalized pane;
at least one holographic camera for a stereoscopic picture recording of a defined detection region vis-à-vis the front side and/or the back side of the transparent main body,
wherein the holographic camera comprises at least one recording hologram which is comprised by the main body and serves to divert light beams from the detection region; and
a control device,
undertaking a person-based authorization verification of a person recorded by the stereoscopic picture recording by the holographic camera and the control device, the person-based authorization verification being based on at least one property of the person establishable by the stereoscopic picture recording; and
outputting an unlock signal for an opening of the door by the control device in the case of at least a person-based authorization.

16. The method of claim 15,
wherein the provided door opener control system further comprises a first communications means for transmitting and receiving signals,
wherein the method further comprises:
establishing a signal exchange with an assigned, second communications means for transmitting and receiving signals if the latter is situated within the transmission and reception range of the first communications means;
undertaking an object-based authorization verification by the control unit and first communications means on the basis of a position and/or movement of the second communications means in relation to a specified near region of the first communications means and the properties of exchanged signals;
outputting an unlock signal by the control unit for an opening of the door in the case of the person-based authorization and an object-based authorization of the second communications means in the object-based authorization verification, and
wherein the person-based authorization verification is only undertaken after an object-based authorization.

17. The method of claim 15,
wherein the provided door opener control system further comprises a closure component which is configured for locking or unlocking the door, and
wherein the closure component undertakes an unlocking of the door when the unlock signal is output by the control device.

18. The method of claim 15,
wherein the provided door opener control system further comprises an operator control component which is configured for an operation of the door by the person,
wherein the operator control component is activated when the unlock signal is output by the control device.

19. The method of claim 15,
wherein the provided door opener control system further comprises at least a first holographic display for a display of a picture, directed at a person, in a defined display region vis-à-vis the front side and/or the back side of the transparent main body,
wherein the control device outputs a picture generating signal to the holographic display in the case of an object-based and/or person-based display, and the holographic display displays a picture corresponding to the picture generating signal, and for a display of an operator control component, an operation request for the operator control component, and/or a display of a desired detection position for the person in the detection region.

20. The method of claim 15,
wherein the provided door opener control system further comprises a door opener for opening a door,
wherein the door opener opens a door in the case of the unlock signal by the control device and/or an open signal by the operator control component.

21. The method of claim 15,
wherein the property of the person establishable by the person-based authorization verification is an individual property which allows the identification of at least one specific person, and/or
wherein the property of the person establishable by the person-based authorization verification is a property suitable for assigning the person to a specific group of persons, especially for assignment to the group of adult persons and/or non-adult persons.

22. The method of claim 15, wherein the control device provides a data-based user profile on the basis of a person-based and/or object-based authorization, the user profile being linked to an authorized person, and further output signals that are dependent on the user profile are generated by the control device on account of said user profile.

* * * * *